United States Patent
Hou et al.

(10) Patent No.: US 12,505,902 B2
(45) Date of Patent: Dec. 23, 2025

(54) HYBRID ATTRIBUTE REACTION MODEL (ARM) IN MOLECULE-BASED EO REACTOR (MB EORXR)

(71) Applicant: AspenTech Corporation, Bedford, MA (US)

(72) Inventors: Zhen Hou, Lexington, MA (US); Darin Campbell, Waltham, MA (US)

(73) Assignee: AspenTech Corporation, Bedford, MA (US)

( * ) Notice: Subject to any disclaimer, the term of this patent is extended or adjusted under 35 U.S.C. 154(b) by 438 days.

(21) Appl. No.: 16/739,291

(22) Filed: Jan. 10, 2020

(65) Prior Publication Data

US 2021/0217497 A1     Jul. 15, 2021

(51) Int. Cl.
    *G16C 20/10*      (2019.01)
    *G06F 30/20*      (2020.01)
    *G16C 20/30*      (2019.01)

(52) U.S. Cl.
    CPC .............. *G16C 20/10* (2019.02); *G06F 30/20* (2020.01); *G16C 20/30* (2019.02)

(58) Field of Classification Search
    CPC .......... G06F 30/20; G06F 30/25; G06F 30/27; G06F 30/28; G16C 20/10; G16C 20/30
    See application file for complete search history.

(56) References Cited

U.S. PATENT DOCUMENTS 3,484,367 A    12/1969   Winsor
6,088,629 A     7/2000   Tomonaga et al.
(Continued)

FOREIGN PATENT DOCUMENTS

EP    3289495 A1    3/2018
EP    3616101 A2    3/2020
(Continued)

OTHER PUBLICATIONS

Horton, Scott R., Linzhou Zhang, Zhen Hou, Craig A. Bennett, Michael T. Klein, and Suoqi Zhao. "Molecular-level kinetic modeling of resid pyrolysis." Industrial & Engineering Chemistry Research 54, No. 16 (2015): 4226-4235 (Year: 2015).*

(Continued)

*Primary Examiner* — Michael Edward Cocchi
(74) *Attorney, Agent, or Firm* — Hamilton, Brook, Smith & Reynolds, P.C.

(57) ABSTRACT

An embodiment represents composition of molecules in a feedstock as a combination of individual molecule representations and molecular attribute representations. A representation of chemistry of a chemical reaction of the feedstock in a chemical reactor is then formulated based on the representations. Then, a simulation of the chemical reaction of the feedstock in the reactor is performed using the representations to determine composition of products of the reaction. A first subset of the products are represented as individual molecule represented products, and a second subset of the products are represented as attribute represented products. In turn, the attribute represented products of the second subset are sampled to determine individual molecule representations of the attribute represented products. As a consequence of the sampling, individual molecule representations of the first and second subsets of the products of the chemical reaction of the feedstock in the chemical reactor result.

20 Claims, 21 Drawing Sheets

(56) References Cited

U.S. PATENT DOCUMENTS

| | | | |
|---|---|---|---|
| 8,515,722 | B2 | 8/2013 | Zong et al. |
| 11,101,020 | B2 | 8/2021 | Watanasiri et al. |
| 2004/0122641 | A1 | 6/2004 | Miller et al. |
| 2007/0043546 | A1 | 2/2007 | Fontes et al. |
| 2007/0050154 | A1 | 3/2007 | Albahri |
| 2012/0303341 | A1 | 11/2012 | Fontes et al. |
| 2014/0128647 | A1 | 5/2014 | Shecterle et al. |
| 2014/0221711 | A1 | 8/2014 | Chitta |
| 2016/0092660 | A1* | 3/2016 | Martinis ............... G16C 20/30 703/2 |
| 2016/0162664 | A1* | 6/2016 | Watanasiri ............ G16C 20/30 703/12 |
| 2018/0166265 | A1 | 6/2018 | Geromanos et al. |
| 2018/0307803 | A1* | 10/2018 | Watanasiri ............ G16C 20/30 |
| 2018/0365353 | A1* | 12/2018 | Devereux ............... G06F 30/20 |
| 2019/0228843 | A1 | 7/2019 | Hou et al. |
| 2019/0353616 | A1 | 11/2019 | Suzuki et al. |
| 2020/0303041 | A1 | 9/2020 | Narayanan et al. |
| 2021/0089689 | A1 | 3/2021 | Hull et al. |
| 2025/0232844 | A1 | 7/2025 | Hou et al. |

FOREIGN PATENT DOCUMENTS

| | | |
|---|---|---|
| JP | 09-138808 A | 5/1997 |
| JP | 2020-155088 A | 9/2020 |
| JP | 2020-165976 A | 10/2020 |
| JP | 2020-166779 A | 10/2020 |
| WO | 97/01183 A1 | 1/1997 |
| WO | WO 03/093815 A1 | 11/2003 |
| WO | WO 2004/081680 A1 | 9/2004 |
| WO | WO 2012/142467 A2 | 10/2012 |
| WO | 2013006755 A2 | 1/2013 |
| WO | 2013/106755 A1 | 7/2013 |
| WO | 2016/178763 A1 | 11/2016 |
| WO | 2018/181320 A1 | 10/2018 |
| WO | 2018/200521 A2 | 11/2018 |
| WO | 2019/143783 A1 | 7/2019 |
| WO | 2020/254066 A1 | 12/2020 |
| WO | 2021141664 A1 | 7/2021 |
| WO | 2023/193172 A1 | 10/2023 |

OTHER PUBLICATIONS

Hou, Zhen. Software tools for molecule-based kinetic modeling of complex systems. Rutgers The State University of New Jersey-New Brunswick, 2011. 246 pages (Year: 2011).*

Wu, Yongwen, and Nan Zhang. "Molecular management for refining operations." PhD diss., University of Manchester, 2010. 279 pages (Year: 2010).*

Zhou, Xin, et al. "One-step leap in achieving oil-to-chemicals by using a two-stage riser reactor: Molecular-level process model and multi-objective optimization strategy." Chemical Engineering Journal 444 (2022): 136684. 20 pages (Year: 2022).*

Zhang, Linzhou, et al. "Molecular representation of petroleum vacuum resid." Energy & fuels 28.3 (2014): 1736-1749. (Year: 2014).*

Nguyen, Thuy TH, et al. "Development of a structure-based lumping kinetic model for light gas oil hydrodesulfurization." Energy & Fuels 31.5 (2017): 5673-5681. (Year: 2017).*

Vernikovskaya, N. V. "An equation-oriented approach to modeling heterogeneous catalytic reactors." Chemical Engineering Journal 329 (2017): 15-24. (Year: 2017).*

Pattison, Richard C. Equation-oriented modeling, simulation, and optimization of integrated and intensified process and energy systems. Diss. 2016. (Year: 2016).*

Dixon, A.G. et al., "Packed tubular reactor modeling and catalyst design using computational fluid dynamics," Advances in Chemical Engineering, vol. 31, 307-389 (2006).

Hou, Zhen, et al. "Molecular-Level Composition and Reaction Modeling for Heavy Petroleum Complex System." Structure and Modeling of Complex Petroleum Mixtures, Springer International Publishing, 168:93-119 (2015).

International Search Report and the Written Opinion of the International Searching Authority, International Application No. PCT/US2019/013954 entitled "Molecule-Based Equation Oriented Reactor Simulation System And Its Model Reduction," filed Jan. 17, 2019, dated Jun. 18, 2019.

Klien, et al., "Molecular Modeling in Heavy Hydrocarbon Conversions," Taylor & Francis, Boca Raton, (2006).

Korre, S.C. et al., "Hydrocracking of polynuclear aromatic hydrocarbons. Development of rate laws through inhibition studies," Industrial & Engineering Chemistry Research, 36:6, 2041-2050 (1997).

Salciccioli, M. et al., "A review of multiscale modeling of metal-catalyzed reactions: Mechanism development for complexity and emergent behavior," Chemical Engineering Science 66:19, 4319-4355 (2011).

Tissot, et al. "Petroleum formation and occurrence," Springer-Verlag, Berlin, (2013).

Yossefi, D. et al., "Stimulation and implementation of laminar flow reactors for the study of combustion systems of ethane, methane and deborane," Fuel, 77:3, 173-181 (1998).

Zhang, L., et al. "Molecular representation of petroleum vacuum resid," Energy & Fuels, 28:1736-1749 (2014).

Zhang, Y., "Identify Similarities in Diverse Polycyclic Aromatic Hydrocarbons of Asphaltenes and Heavy Oils Revealed by Noncontact Atomic Force Microscopy: Aromaticity, Bonding, and Implications in Reactivity," 25 pages, (2019).

International Search Report and the Written Opinion of the International Searching Authority, International Application No. PCT/US2020/060136 entitled "Hybrid Attribute Reaction Model (ARM) in Molecule-Based EO Reactor (MB EORXR)" dated Mar. 1, 2021 (1086.2076-001).

Alvarez, A., et al., "On the application of petroleum feedstock modeling techniques for developing molecule-based models of hydrocarbon conversion processes" Catalysis Today, Elsevier, Amsterdam, NL, vol. 220, May 13, 2013.

Campbell, D.M., et al. "Attribute-Based Modeling of Resid Structure and Reaction", Industrial & Engineering Chemistry Research, vol. 48, No. 4, Jan. 23, 2009.

Horton, S.R., et al., "Moledule-based modeling of heavy oil", Science China Chemistry, vol. 56, No. 7, Jun. 5, 2013.

Nguyen, T., et al., "A framework for developing a structure-based lumping kinetic model for the design and simulation of refinery reactors", Computers & Chemical Engineering, vol. 106, Jul. 1, 2017.

Ply, S., et al., "Modeling the Composition of Crude Oil Fractions Using Constrained Homologous Series", Industrial & Engineering Chemistry Research, vol. 50, No. 18, Aug. 15, 2011.

Quann, R.J., et al., "Building useful models of complex reaction systems in petroleum refining", Chemical Engineering Science, Oxford, GB, vol. 51, No. 10, May 1, 1996.

"Ren, Y., et al., Molecular reconstruction: Recent progress toward composition modeling of petroleum fractions", Chemical Engeneering Journal, vol. 357, Sep. 11, 2018.

International Preliminary Report on Patentability for International Application No. PCT/US2019/013954 entitled "Molecule-Based Equation Oriented Reactor Simulation System And Its Model Reduction," date of mailing Jul. 30, 2020.

International Preliminary Report on Patentability for PCT/US2020/060136 entitled "Hybrid Attribute Reaction Model (ARM) in Molecule-Based EO Reactor (MB EORXR)" dated Jul. 21, 2022.

Cohen, N., "Revised Group Activity Values for Enthalpies of Formation (at 298 K) of Carbon-Hydrogen and Carbon-Hydrogen-Oxygen Compounds" Journal of Physical and Chemical Reference Data 25, 1411-1481, 1996.

Parijs, et al., "Kinetics of Hydrodesulfurization on a CoMo/$\gamma$-Al2O3 Catalyst. 2. Kinetics of the Hydrogenolysis of Benzothiophene" Ind. Eng. Chem. Prod. Res. Dev. 1986, 25, 437-443.

Perini et al., "An analytical Jacobian approach to sparse reaction kinetics for computationally efficient combustion modelling with large reaction mechanisms" Energy & Fuels 26,8, 2012.

Chen et al., A Simultaneous-Modular Approach to Process Flowsheeting and Optimization, Part I: Theory and Implementation, AIChE Journal, Nov. 1985, 31/11.

(56) References Cited

OTHER PUBLICATIONS

Closed-Form vs. Open-Form Models, Aspentech, Aspen Plus: Real Time Modeling and Optimization, 2009, 26 pages.
Cuthrell et al., Simultaneous Optimization and Solution Methods for Batch Reactor Control Profiles, Computers chem. Engng. 1989, 49-62, 13/1/2.
Getting Started Using Equation Oriented Modeling, Aspentech, Version V8.4, Nov. 2013, 100.
Gross, J. and Sadowski, G., "Perturbed-Chain SAFT: An Equation of State Based on a Perturbation Theory for Chain Molecules," Ind. Eng. Chem. Res. 40: 1244-1260 (2001).
Gross, J. et al., "Modeling Copolymer Systems Using the Perturbed-Chain SAFT Equation of State," Ind. Eng. Chem. Res. 42: 1266-1274 (2003).
International Search Report and Written Opinion received for PCT Patent Application No. PCT/CN2022/085499, mailed on Dec. 16, 2022, 9 pages.
Marshall, Alan G. et al., "Petroleomics: Chemistry of the underworld," PNAS, vol. 105, No. 47, p. 18090-p. 18095 (2008).
Peng, Molecular modelling of petroleum processes, dissertation, University of Machester, 1999.
Saine Aye, M. M. and Zhang, N., "A Novel Methodology in Transforming Bulk Properties of Refining Streams into Molecular Information," Chem. Eng. Sci., 60: 6702-6717 (2005).
Verstraete et al., Molecular Reconstruction of Heavy Petroleum Residue Fractions, Chemical Engineering vol. 65, No. 1., pp. 304-312 (2010).
Wu, Y. and Zhang, N., "Molecular Characterization of Gasoline and Diesel Streams," Ind. Eng. Chem. Res., 49: 12773-12782 (2010).
Borhani et al. "Molecular modeling of the ideal gas enthalpy of formation of hydrocarbons." Fluid Phase Equilibria, vol. 360, pp. 423-434. (Year: 2013).
Cardenas-Guerra et al. "A reactive distillation process for deep hydrodesulfurization of diesel: Multiplicity and operation aspects." Computers and Chemical Engineering, vol. 34, pp. 196-209. (Year: 2010).
De Oliveira et al. "A Review of Kinetic Modeling Methodologies for Complex Processes." Oil & Gas Science and Technology—Rev. IFP Energies Nouvelles, vol. 71(45), pp. 1-49. (Year: 2016).
Marwan et al. "Petri Nets in Snoopy: A Unifying Framework for the Graphical Display, Computational Modelling, and Simulation of Bacterial Regulatory Networks." Jacques van Heiden et al. (eds.), Bacterial Molecular Networks: Methods and Protocols, Methods in Molecular Biology, vol. 804, pp. 409-437. (Year: 2011).
Rigas et al. "The Gibbs Energy Minimization Approach in the Estimation of Detonation, Explosion and Work Production Parameters of Confined Charges." Propellants, Explosives, Pyrotechnics, vol. 19, pp. 76-81. (Year: 1994).
Schulz et al. "Gas oil deep hydrodesulfurization: refractory compounds and retarded kinetics." Catalysis Today, vol. 49, pp. 87-97. (Year: 1999).
Schwer et al. "On Upgrading the Numerics in Combustion Chemistry Codes." Combustion and Flame, vol. 128, pp. 270-291. (Year: 2002).
Sharma et al. "Towards computationally-efficient modeling of transport phenomena in three-dimensional monolithic channels." Applied Mathematics and Computation, vol. 254, pp. 392-407. (Year: 2015).
Shi et al. "Implementation of NAMD molecular dynamics non-bonded force-field on the cell broadband engine processor." IEEE International Symposium on Parallel and Distributed Processing, Miami, FL, USA, pp. 1-8, doi: 10.1109/IPDPS.2008.4536470. (Year: 2008).
PCT International Preliminary Report on Patentability for International Application No. PCT/CN2022/085499, entitled "Automated, Configurable, Rigorous Reversible Lumping for Chemical Separations," mailed on Oct. 17, 2024.

* cited by examiner

HYBRID ATTRIBUTE REACTION MODEL (ARM) IN MOLECULE-BASED EO REACTOR (MB EORXR)

BACKGROUND

Existing computer-based methods and systems for modeling chemical reactions can model thousands of species and similarly, thousands of reactions. However, these existing methods are not capable of modeling the structures and reactions in certain circumstances, such as when modeling reactions of heavy resid (e.g., crude oil residue).

Accordingly, there is a need for improved computer-implemented methods and systems for modeling chemical reactions.

SUMMARY

Embodiments of the present invention provide methods and systems for modeling chemical reactions in a chemical reactor. Embodiments can model the chemical reactions to determine the products of the reaction.

One such example embodiment is directed to a method that models a chemical reaction in a chemical reactor to determine products of the reaction. The method represents, in computer memory, composition of molecules in a feedstock as a combination of representations including individual molecule representations and molecular attribute representations. The method continues and formulates, in the computer memory, a representation of chemistry of a chemical reaction of the feedstock in a chemical reactor based on the individual molecule representations and the molecular attribute representations. Next, the method performs a simulation of the chemical reaction of the feedstock in the chemical reactor using the individual molecule representations, the molecular attribute representations, and the formulated representation of the chemistry of the chemical reaction. The simulation determines composition of products of the reaction where a first subset of the products of the reaction are represented in the computer memory as individual molecule represented products and a second subset of the products of the reaction are represented in the computer memory as attribute represented products. According to an embodiment, the first and second subsets are non-overlapping. To continue, the attribute represented products of the second subset are sampled to automatically determine individual molecule representations of said attribute represented products such that individual molecule representations of the first and second subsets of the products of the chemical reaction of the feedstock in the chemical reactor result. In this way, the method determines individual molecule representations for the products of the reaction.

In embodiments, the steps of the method, i.e., the representing, formulating, simulating, and sampling may be automatically performed or may be performed responsive to user input.

According to an embodiment, the molecular attribute representations include molecule type and indications of one or more side chains. In another embodiment, the representation of the chemistry of the chemical reaction comprises chemical reactions derived from at least one of: thermal chemistry, acid catalyzed chemistry, and metal catalyzed chemistry.

An alternative embodiment combines the individual molecule represented products and the individual molecule representations of the attribute represented products to determine full molecular compositions of the products. Yet another example embodiment defines equations used in performing the simulation based upon user input. In such an embodiment, the user input is indicative of at least one of: a reaction type, a reaction path, a thermodynamic property, a physical property, and a rate law expression.

Another embodiment selects, based upon user input, which molecules in the feedstock to represent using individual molecule representations and which molecules to represent using molecular attribute representations. In one such example embodiment, the user input indicates a carbon number limit and a ring number limit for molecules to be represented using individual molecule representations.

Embodiments also perform further processing and can perform and implement real-world actions based upon the determined products of the reaction. For instance, an example embodiment evaluates a modification of a chemical processing procedure based upon the determined individual molecule representations of the first and second subsets of the products of the chemical reaction. Another embodiment optimizes a reaction process based upon the determined individual molecule representations of the first and second subsets of the products of the chemical reaction. Yet another embodiment predicts product properties based upon the determined individual molecule representations of the first and second subsets of the products of the chemical reaction. An example embodiment models integration of the chemical reactor with downstream units by predicting molecular detail for the downstream units based upon the determined individual molecule representations of the first and second subsets of the products of the chemical reaction. Further still, yet another example embodiment optimizes a system of complex hydrocarbon mixtures' conversion based upon the determined individual molecule representations of the first and second subsets of the products of the chemical reaction using an Equation Oriented (EO) method.

An embodiment performs the simulation utilizing at least one of: attribute-based mass balance equations; attribute-based energy balance equations; and attribute-based momentum balance equations. Further, it is noted that embodiments may be used to simulate any feedstock known to those of skill in the art. For example, in embodiments the feedstock is at least one of: a hydro-carbon mixture, coal, and shale oil.

Another embodiment is directed to a system for modeling a chemical reaction in a chemical reactor to determine products of the reaction, the system including a processor and a memory with computer code instructions stored thereon. In such an embodiment, the processor and the memory, with the computer code instructions, are configured to cause the system to implement any embodiments described herein.

Yet another embodiment is directed to a computer program product for modelling a chemical reaction in a chemical reactor to determine products of the reaction. The computer program product comprises a computer readable medium with computer code instructions stored thereon where, the computer code instructions, when executed by a processor, cause an apparatus associated with the processor to perform any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Existing methods for simulating chemical reactions, such as Aspen Technology, Inc.'s (Assignee's) Molecule-Based EO (Equation Oriented) Reactor (MB EORXR) described in U.S. patent application Ser. No. 16/250,445, allow users to model refining chemistries at the molecular level. MB EORXR can use more than 2400 species and 5700 reactions to describe the conversion of hydrocarbon mixtures up to and including resid. However, the structures and reactions of heavy resid modeled in the molecule based hydrocracker/hydrotreater of MB EORXR are still limited. According to recent analytical chemistry research, there are hundreds of distinct aggregated ring structures in the heavy petroleum resid fraction that determine the reactivity, thermodynamics, and key properties of petroleum. Based on this research, there are millions of individual heavy molecular structures. Computational resources are a significant challenge to model such a large system via existing methods, such as MB EORXR. The statistics of the computational requirements for a molecule based reactor that models full detailed compositions from naphtha through heavy resid (referred to as "full MB model" herein) are listed in Table 1.

TABLE 1

Statistics of the computational requirements for MB EO reactor

| | Naphtha | Diesel | Gasoil | VGO | Resid |
|---|---|---|---|---|---|
| # of species | O(200) | O(500) | O(1000) | O(2000) | 0(>10^6) |
| # of reactions | O(500) | O(1000) | O(2500) | O(5000) | 0(>10^6) |
| # of Equation in a single bed | O(3*10^4) | O(6*10^4) | O(2*10^5) | O(3*10^5) | 0(>10^7) |
| # of Equation in a hydrocracker (4 beds) | O(2*10^5) | O(5*10^5) | O(10^6) | 0(>10^6) | O(>10^8) |

Figure 1:
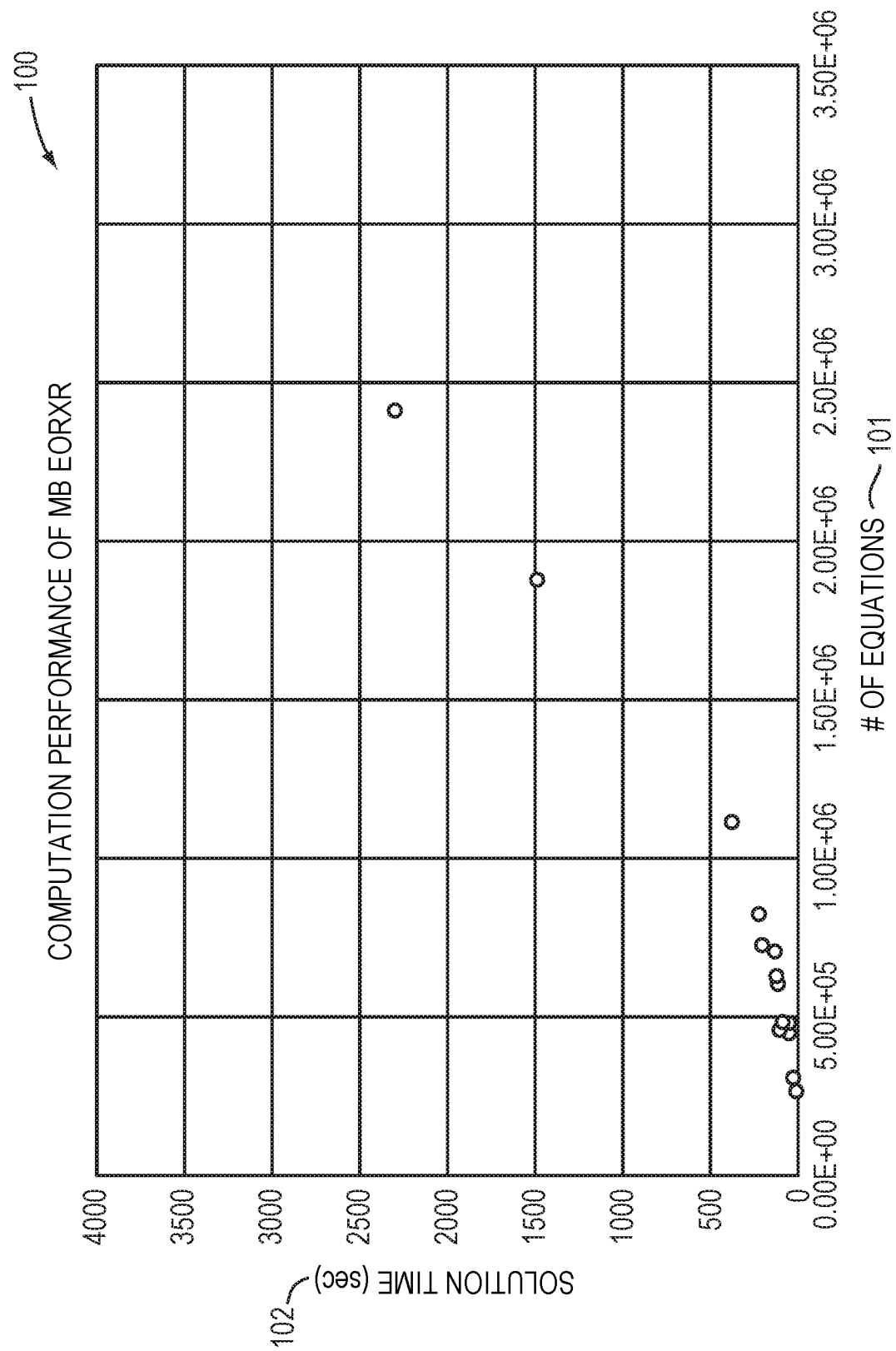
FIG. 1 is a graph showing computation performance of a state of the art simulation methodology.

Table 1 shows that the number of molecular components and reactions increases exponentially from light naphtha to heavy resid. As a result, the number of equations required to model a reactor bed also grows dramatically from naphtha to resid. Furthermore, modelling a complex flowsheet including 2-10 reactor beds requires even more computational resources. For instance, the number of equations and variables for a 4 bed hydrocracker is almost one order of magnitude larger than that of a single reactor bed. The large number of equations needed to perform these simulations can significantly affect the computational performance of an equation oriented model. FIG. 1 shows in the plot 100 the relationship between the number of equations 101 in an MB EORXR model and its solution time 102. The results shown in the plot 100 were obtained on a computer with a 3.4 GHz CPU and 32 GB of RAM.

From FIG. 1 it can be seen that a model with, on the order of (hereinafter "O") ($10^6$) equations roughly needs more than five minutes to solve. Ideally, the solution time of a typical flowsheet of an industrial reactor should be a few minutes or less. Some applications (e.g. Real Time Optimization (RTO)) need even more rapid solution times O (secs). Therefore, the number of equations of a MB EORXR model need to be limited to less than $10^6$ in order to obtain the performance needed for industrial applications. From Table 1, the performance of modeling the fractions of gasoil, VGO, and resid via the MB EO reactors with full molecular detail in a complex flowsheet cannot satisfy the required performance of a typical industrial application.

Although carbon number-based model reduction as described in U.S. patent application Ser. No. 16/250,445 can be implemented to improve the performance of MB reactor in a large system, it cannot fully address the computational issue described above. There are two main limitations of the carbon number-based model reduction.

The first limitation is that this approach cannot reduce the number of species of a complex system enough to handle a heavy resid feed that can include hundreds of distinct molecular types. If N molecular types exist in a reaction system, and there are M carbon number derived species for each molecular type, there are N*M species in a model with full detailed composition. The carbon number-based model reduction can decrease discretized carbon number M to a smaller number M' (i.e., where M' is typically between ¼ and ½ of M) with a given criteria and the resulting number of species in a carbon number-based reduction model is N*M'. However, a large number of N molecular types can still lead to an intractably large number of species for the model.

The second limitation of the carbon number-based model reduction is the robustness of the model. Because it uses a numerical spline function to reverse the distribution to the full detailed species from the reduced carbon number lumps, in practice, robustness can be a problem of that approach. Smaller steps and more iterations are usually needed to make the model converge which increases the solution time of the model. This is especially true if a flowsheet contains multiple reactor beds and recycle streams or the product specifications are fixed to calculate kinetic parameters or operating conditions.

Figure 2:
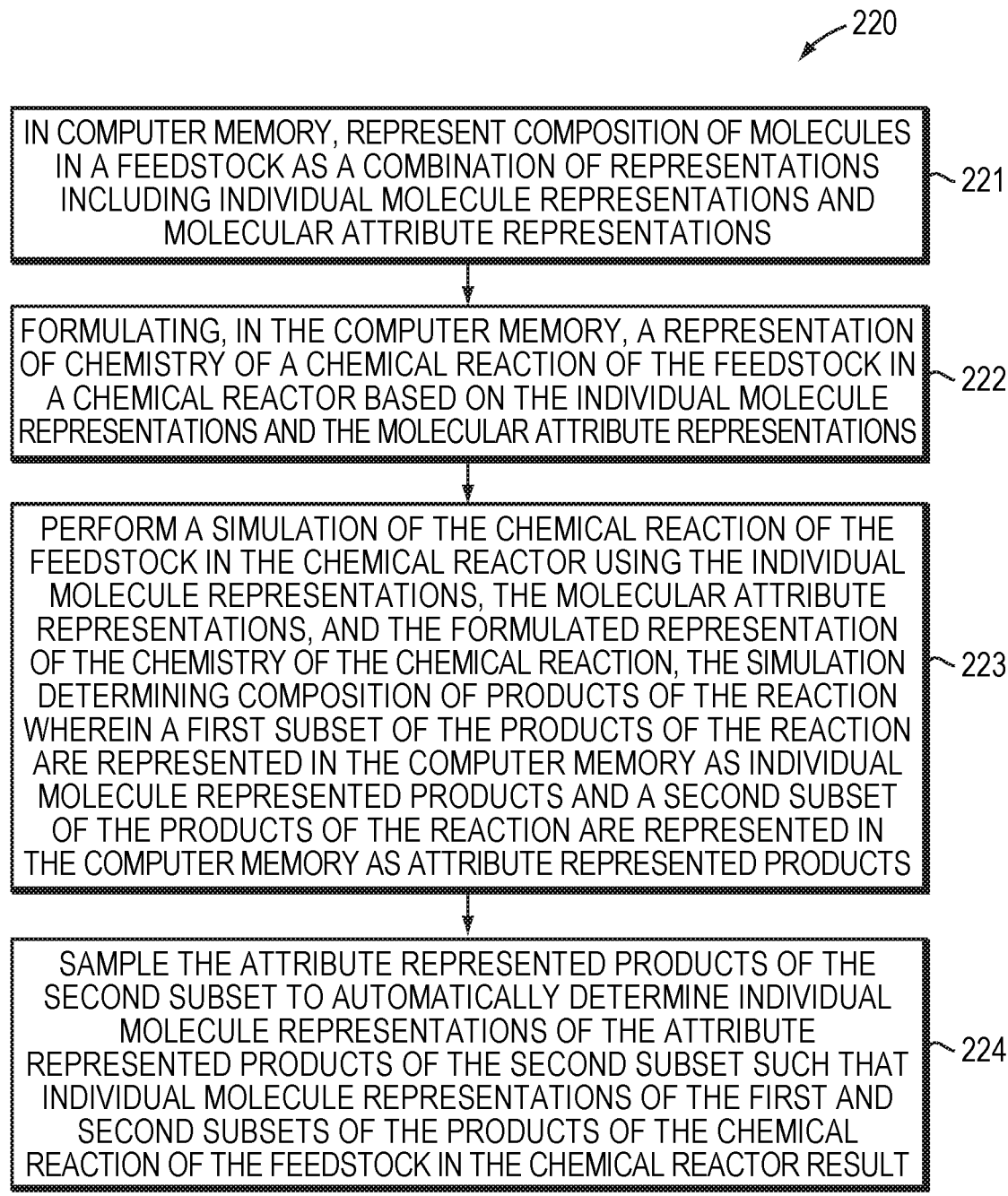
FIG. 2 is a flowchart depicting a method for modelling a chemical reaction in a chemical reactor to determine products of the reaction according to an embodiment.

Therefore, a new approach is needed to reduce the computational burden of a large MB EO reactor model and maintain the robustness of the model solution. FIG. 2 illustrates one such example method 220. The method 220 is computer implemented and may be performed via any combination of hardware and software as is known in the art. For example, the method 220 may be implemented via one or more processors with associated memory storing computer code instructions that cause the processor to implement steps 221, 222, 223, and 224 of the method 220. Further, the method 220 may be implemented in existing simulation software such as Aspen Technology, Inc.'s (Assignee's) Molecule-Based EO (Equation Oriented) Reactor (MB EORXR) described in U.S. patent application Ser. No. 16/250,445. In such an implementation, the method 220 and/or any other embodiments described herein, may be implemented in the MB EORXR block.

Figure 6:
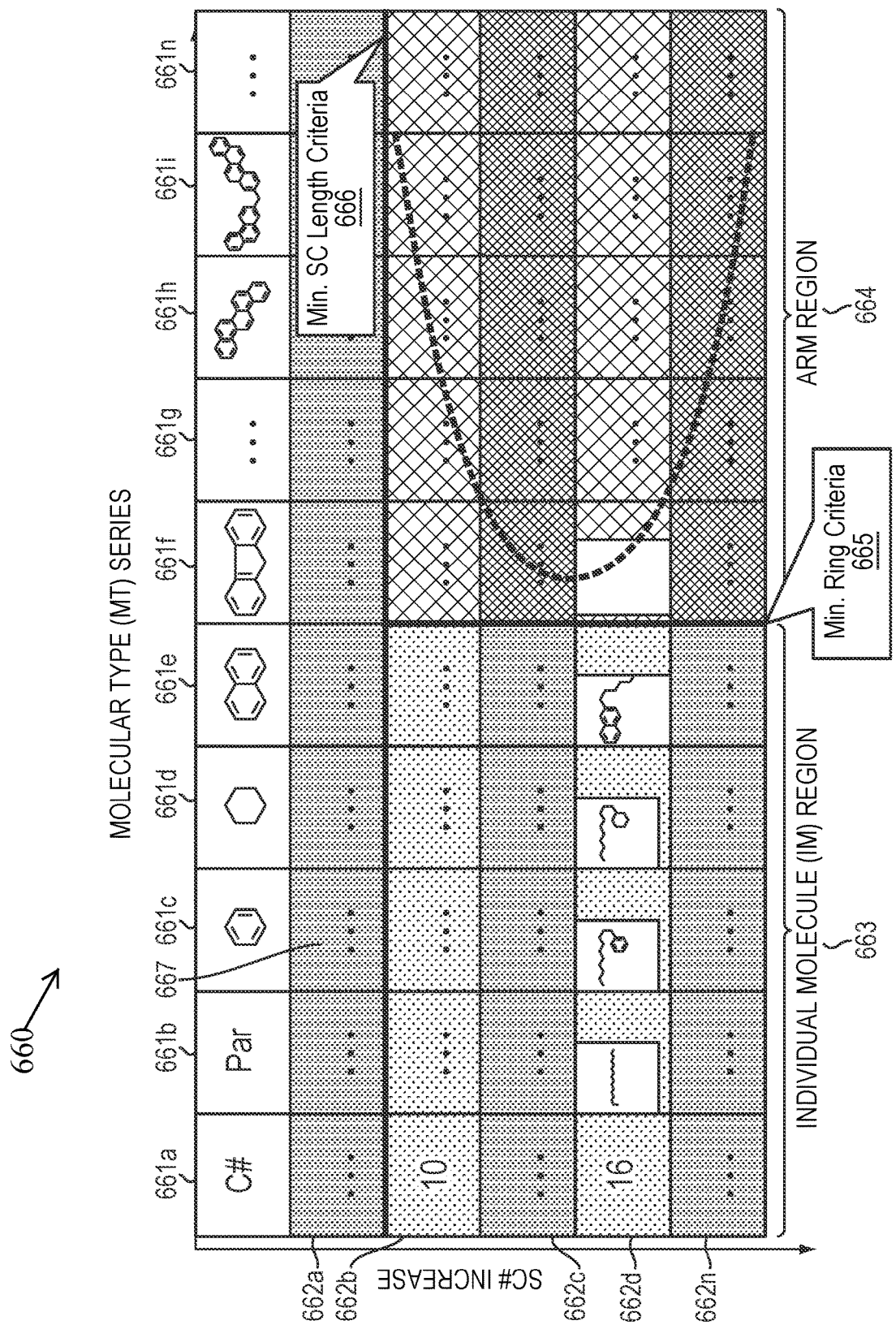
FIG. 6 is a chart depicting molecule representations implemented and employed in embodiments.

The method 220 begins at step 221 by representing, in computer memory, composition of molecules in a feedstock as a combination of representations including individual molecule representations and molecular attribute representations. According to an embodiment, the molecular attribute representations at step 221 include molecule type and one or more side chains. Another embodiment selects, based upon user input, which molecules in the feedstock to represent at 221 using the individual molecule representations and which molecules to represent using the molecular attribute representations. In such an example embodiment, the user input indicates a carbon number limit and a ring number limit for molecules to be represented using the individual molecule representations. In such an embodiment, molecules with more carbons and rings than the limit are represented using molecular attribute representations. According to an embodiment, the feedstock is represented as described hereinbelow in relation to FIG. 6. In an embodiment, the feedstock is represented by two regions: individual molecule (IM) region and molecular attribute representation (ARM) region. An example IM region 663 is depicted in FIG. 6. The molecules in the IM region are represented individually. An example ARM region 664 is depicted in FIG. 6. The molecules in the ARM region are represented by two structural attributes: molecular type and main side chain respectively. The molecules in the ARM region are parsed into molecular types and main side chains by their chemical structures. As a result, a distribution of molecular types and a distribution of main side chain length are obtained by a given set of mole compositions of those molecules in the ARM region.

The method 220 continues and at step 222 formulates, in the computer memory, a representation of the chemistry of a chemical reaction of the feedstock in a chemical reactor based on the individual molecule representations and the molecular attribute representations. According to an embodiment, the chemistry of the reaction is represented as described hereinbelow in relation to FIG. 7. In an embodiment, the representation of the chemistry of the chemical reaction formulated at step 222 comprises chemical reactions derived from at least one of: thermal chemistry, acid catalyzed chemistry, and metal catalyzed chemistry. According to an embodiment, the representation of the chemistry of the chemical reaction includes stoichiometric reactions and appropriate rate law form. Further, in embodiments, the representation of the chemistry of the chemical reaction can be derived from the fundamental thermal chemistry, acid catalyzed chemistry and metal catalyzed chemistry, such as paraffin catalytic cracking, paraffin hydrocracking, paraffin thermal cracking, paraffin hydrogenolysis, side-chain cracking, paraffin hydrogen transfer, paraffin isomerization, naphthenic ring isomerization, naphthenic ring aromatization, aromatic ring saturation, olefin saturation, paraffin dehydrogenation, hydrodesulfurization, hydrodenitrogenation, and hydrodeoxygenation, amongst other examples. Generally, any chemical reaction can be regarded as a chemical bond breaking/chemical bond formation process. For a given mechanism, selected chemical bonds of structure complexes in reactants are broken up and products are generated via the formation of new chemical bonds among those structure complexes. Usually, those structure complexes are elaborated in individual molecules and the chemical reactions of individual molecules are generated. However, the same approach can also be applied to the structure complexes in attributes and the chemical reactions of the molecular attribute representation.

Next, at step 223, a simulation of the chemical reaction of the feedstock in the chemical reactor is performed using the individual molecule representations (output of step 221), the molecular attribute representations, and the formulated representation of the chemistry of the chemical reaction (output of step 222). The simulation determines composition of products of the reaction where a first subset of the products of the reaction are represented in the computer memory as individual molecule represented products and where a second subset of the products of the reaction are represented in the computer memory as attribute represented products. In an embodiment, the Equations 1-10 described hereinbelow are utilized to perform the simulation at step 223. An embodiment defines equations used in performing the simulation at 223 based in part upon user input. According to an embodiment, the user input is at least one of: a reaction type, a reaction path, a thermodynamic property, a physical property, and a rate law expression. For example, the user input can include reaction paths of individual molecules and molecular attributes, the reaction types of all reactions, key thermodynamic and physical properties of all individual molecules and molecular attributes, and the specifications of rate law expressions, amongst other examples. In embodiments, the simulation may be performed at 223 utilizing one or more attribute equations. For example, performing the simulation at 223 may utilize at least one of: attribute-based mass balance equations; attribute-based energy balance equations; and attribute-based momentum balance equations.

To continue, at step 224, the attribute represented products of the second subset (output of step 223) are sampled to automatically determine individual molecule representations of the attribute represented products of the second subset. In this way, step 224 results in individual molecule representations of the first and second subsets of the products of the chemical reaction of the feedstock in the chemical reactor. As such, the method 220 determines individual molecule representations for the products of the reaction.

An alternative embodiment of the method 220 combines the individual molecule represented products (output from step 223) and the individual molecule representations of the attribute represented products (output of step 224) to determine full molecular compositions of the products.

The method 220 may also perform further processing or take real-world actions based upon the products of the reaction determined at 224. For instance, an example embodiment evaluates a modification of a chemical processing procedure, e.g., a real-world refining process, based upon the determined individual molecule representations of the first and second subsets of the products of the chemical reaction (output at 224). Another embodiment optimizes a reaction process based upon the determined individual molecule representations of the first and second subsets of the products of the chemical reaction. Yet another embodiment predicts product properties based upon the determined individual molecule representations of the first and second subsets of the products of the chemical reaction. An example embodiment models integration of the chemical reactor with downstream units by predicting molecular detail for the downstream units based upon the determined individual molecule representations of the first and second subsets of the products of the chemical reaction. Yet another example embodiment optimizes a system of complex hydrocarbon mixtures' conversion based upon the determined individual molecule representations of the first and second subsets of the products of the chemical reaction using an Equation Oriented (EO) method. In such an embodiment, that optimization can be applied to an online system to perform a real time optimization (RTO) and use the EO solution method to get the best performance and flexibility. Further, in an example embodiment, the EO method solves the equations necessary for the reactor system simultaneously. This is particularly effective for systems with recycles (e.g., the hydrogen recycle for a hydrocracker) and specification changes (e.g., specifying the inlet temperature to each reactor bed by calculating the necessary quench gas). The drawback of using EO for a molecular based hydrocracker is that the number of equations is very large and this can be memory intensive and slow. However, the hybrid ARM approach addresses this by greatly reducing the number of equations to significantly improve the memory requirements and solution performance.

Further, it is noted that embodiments, e.g., the method 220, may be used to simulate any feedstock known to those of skill in the art. For example, in embodiments the feedstock is at least one of: a hydro-carbon mixture, coal, and shale oil.

Embodiments provide a new hybrid attribute reaction model (ARM) approach for simulating reactions. Embodiments, e.g., the hybrid ARM approach, are described herein as being implemented in the MB EORXR block available from Aspen Technology, Inc. (Assignee), however, embodiments are not so limited and may be employed in any refinery process workflow or other computer implementation known to those of skill in the art. The hybrid ARM model in the MB reactor can sufficiently reduce the number of species in a complex hydrocarbon mixture from naphtha through heavy resid to overcome computational limitations while maintaining full molecular detail and robust convergence performance.

Embodiments can use a set of molecular structural attributes (molecular types and side chains) to describe complex heavy molecules in petroleum fractions. Further, embodiments can leverage a simplified sampling protocol to define a complex molecular component in Aspen Technology, Inc.'s (Assignee's) MB EORXR by the juxtaposition of a limited number of structural attributes. The individual isomers of small naphtha molecules are also considered.

In an embodiment, the reactions and kinetics of complex chemistry are written in terms of a limited number of structural attributes for heavier fractions. The reactions and kinetics of lighter fractions can be represented by individual components. The combination of structural attributes and individual components can be solved together.

In an example embodiment, the MB EORXR framework and the model builder are enhanced to support the automation of the code generation of the hybrid ARM model including residuals, sparsity, and jacobians in terms of Aspen Technology, Inc.'s (Assignee's) EO format. Further, the region for using an ARM model and an individual component model is flexible. Users can select the granularity of a hybrid MB model (ARM model and individual model) by specifying the structural limits (e.g., carbon number and ring number).

Further, in embodiments, the hybrid ARM model can maintain the full molecular detail. The results of embodiments utilizing a hybrid ARM MB model are close to the full MB model. However, the computational burden of a hybrid ARM MB model according to an embodiment is much smaller than a full MB model. In addition, the hybrid ARM MB model is robust to solve. As a result, embodiments provide a fast and robust solution of a complex flowsheet from naphtha to heavy resid in industrial applications.

Implementing embodiments, e.g., the hybrid ARM model, in MB EORXR allows users to create a molecular level kinetic model for complex refining chemistries with an affordable computational burden. The combination of a finite number of structural attributes and a limited number of individual components are used to describe an almost infinite number of molecules and reactions in a wide range of complex hydrocarbon mixtures from naphtha to heavy resid. As a result, the hybrid ARM model for complex feedstocks up through heavy resids can be solved robustly within a few minutes while maintaining full molecular details.

The resid fraction of petroleum hydrocarbon mixtures (heavy oil) usually contains millions of complex large molecules. Those molecules are typically identified as island or archipelago structures. A representative heavy molecule 330 is shown in FIG. 3.

Figure 3:
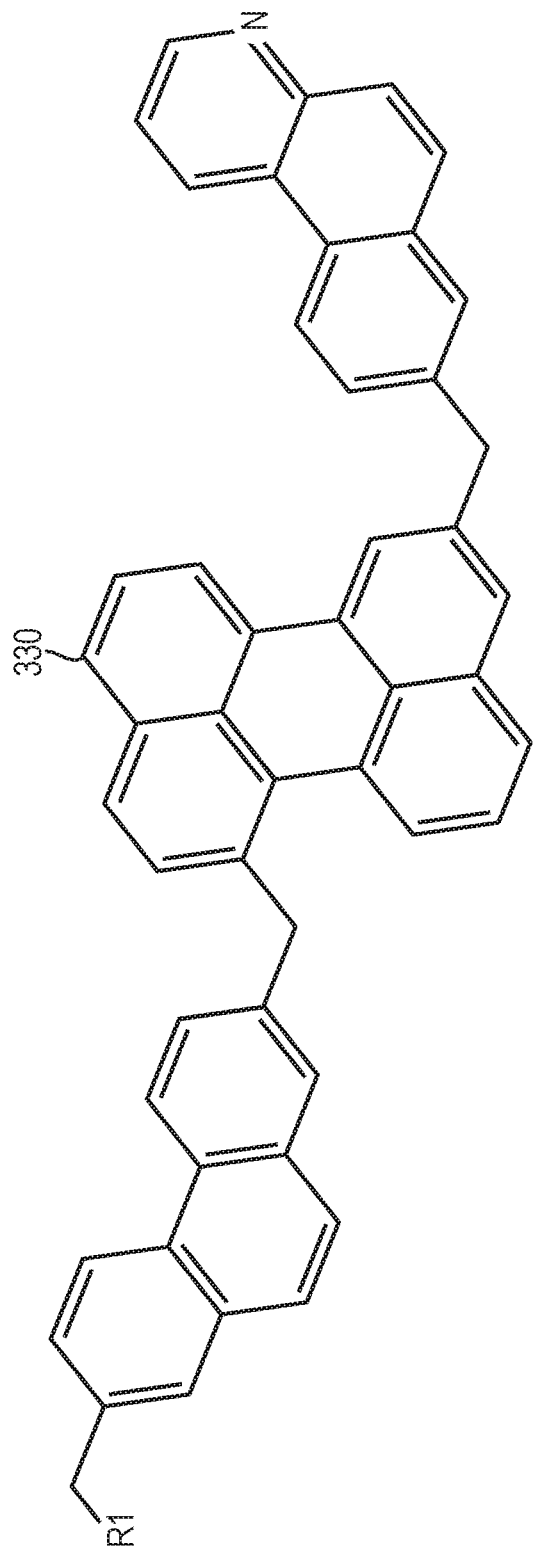
FIG. 3 is a depiction of a representative molecule in heavy oil that can be simulated using embodiments.

As shown in FIG. 3, a resid molecule is often a complex molecule that includes a number of aggregated ring structures and multiple different structural functional groups. Hundreds of such complex molecular types exist in a heavy oil fraction (U.S. patent application Ser. No. 15/961,310; Zhang, Linzhou, et al. "Molecular representation of petroleum vacuum resid" Energy & Fuels 28.3 (2014): 1736-1749; Zhang, Yunlong. "Identify Similarities in Diverse Polycyclic Aromatic Hydrocarbons of Asphaltenes and Heavy Oils Revealed by Noncontact Atomic Force Microscopy: Aromaticity, Bonding, and Implications in Reactivity" (2019)). There are many possible substituted positions in the rings of a large resid molecule. Combining all of the possible cores following probability distributions leads to an explosion of a nearly infinite number of molecules in heavy resid. On the other hand, the limitations of analytical chemistry also cannot explicitly detect each individual isomer in a heavy oil fraction. Due to the low volatility, only incomplete information can be obtained from available measurements. The detailed substituent's effects are unclear and relatively unimportant to the process of heavy oil upgrading (e.g., properties, reactivity, and thermodynamics).

Figure 4:
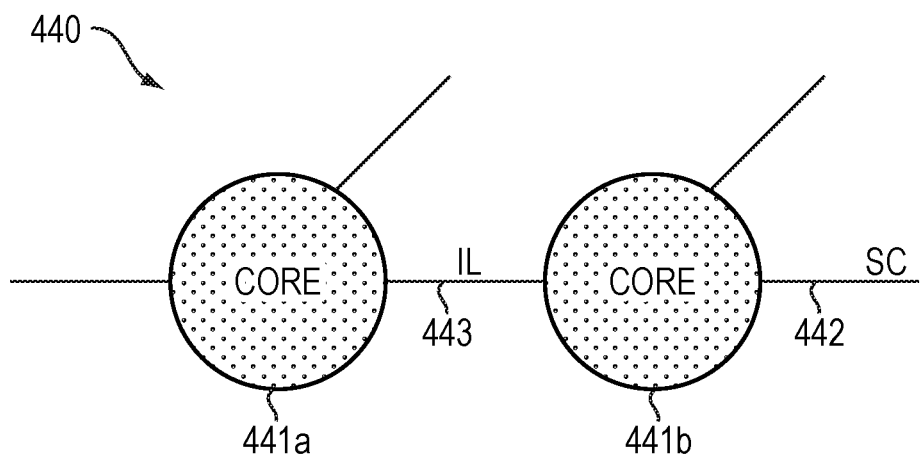
FIG. 4 is a representation of a conceptual heavy molecule that may be utilized in embodiments to simulate a reaction.

Therefore, embodiments can use a set of structural attributes to describe the molecular information in heavy oil. The structural attributes are a set of molecular pieces. For example, one such embodiment uses three kinds of structural attributes to describe a complex molecule (such as those molecules described in Zhen, et al. "Molecular-Level Composition and Reaction Modeling for Heavy Petroleum Complex System" Structure and Modeling of Complex Petroleum Mixtures, Springer International Publishing, 2015. 93-119): Core, Sidechain (SC), and Inter-core-linkage (IL). Core is used to describe the aggregated ring structures in a resid molecule. On the order of 100~1000 Cores are in a heavy oil fraction. SC is used to represent the free terminal substituent attached to a Core structure. IL is used to represent the substituent between two or more Core structures. On the order of 100~1000 SC and IL can exist in a heavy oil fraction. A molecule, such as the heavy molecule 440 shown in FIG. 4, can be described as a juxtaposition of Cores 441a-b, SC 442, and IL 443 structures. Using this representation (Core, Sidechain, and IL as shown in FIG. 4), simplifies the variations of substituted effects in heavy molecules and provides a significant reduction to the number of species in a model for heavy oil conversion.

Figure 5:
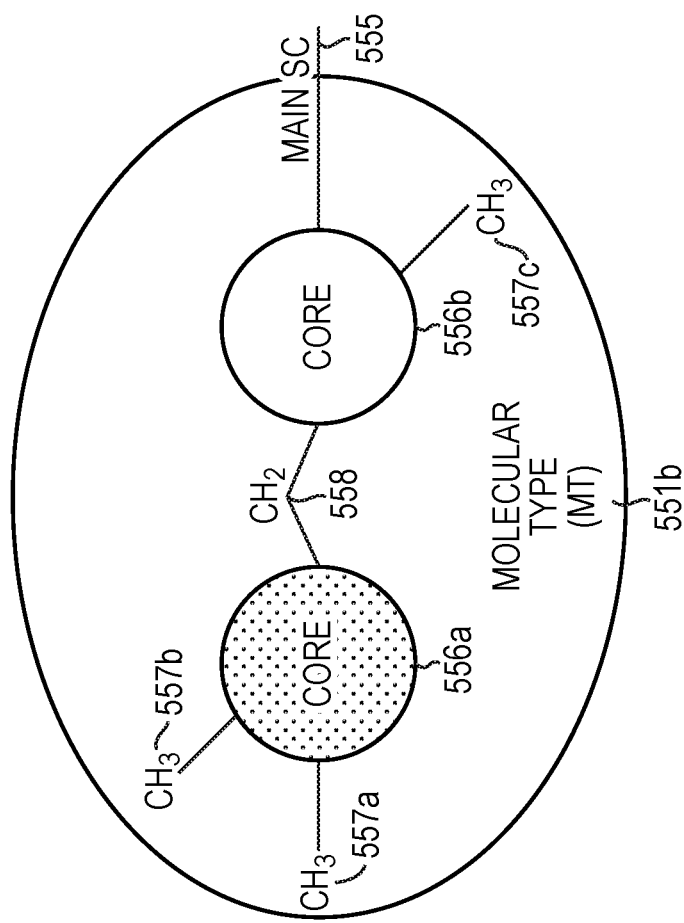
FIG. 5 illustrates a sampling methodology that is employed in embodiments.
Figure 5:
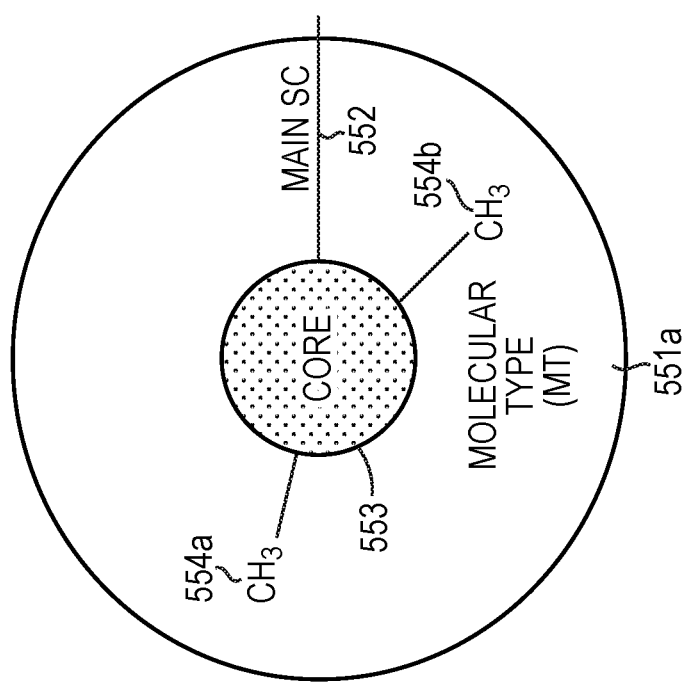

However, there is still a large combinatorial problem if the variations of all possible IL and SCs are fully sampled out. Therefore, embodiments employ a simplified sampling protocol to satisfy the computational burden afforded by industrial applications. An example attribute sampling protocol to define heavy molecules is shown in FIG. 5.

In an embodiment, the combinatorial problem of the substituents from SCs and ILs are reduced by a main SC model. Instead of sampling all possible SCs for all substituted positions in a Core structure, the sampling method shown in FIG. 5 assumes there is only one main SC whose carbon number is larger than 1 in a complex molecule. Other substituted positions are only allowed to be attached by a methyl group. The sampling method depicted in FIG. 5 uses a fixed structural group (e.g. methyl group) to describe IL. As a result, as shown in FIG. 5, a new attribute called molecular type (MT) is defined by the combination of Cores and methyl groups in the substituted positions of free terminal and between multiple cores. MT can be used to represent the island structure 551a as the left side of FIG. 5 and the archipelago structure 551b as the right side of FIG. 5. The island structure 551a shows how an island heavy molecule is sampled out by a given MT and a given main SC 552. The given MT in 551a only contains one core structure 553 and a few methyl groups 554a-b. By attaching a main SC 552 with the given length to that MT 551a, an island heavy molecule is represented. The archipelago structure 551b shows how an archipelago heavy molecule is sampled out by a given MT and a given main SC 555. The given MT in 551b contains multiple core structures 556a-b, a few free terminal methyl groups 557a-c and an IL 558. By attaching a main SC 555 with the given length to that MT, an archipelago heavy molecule is represented. MT is consistent with the homologous series applied in MB EORXR and represents the important behavior (reactions, thermodynamics, and properties) of a molecule in a complex process. The variations of substituents in the heavy oil fraction only appear in the main SC. The additional substituents' effects are simplified to methyl groups only. This assumption is an optimal approximation from an engineering view because it can identify the molecular component by the similarity in major reactivities, thermodynamics, and petroleum properties.

The details of MTs' structures can be determined by users in terms of their chemical expertise. An example embodiment uses the Kinetic Model Toolkit (KMT) provided by Klein Research Group (KRG), University of Delaware, to create MT structures in Aspen Technology, Inc.'s (Assignee's) MB HCR model. Usually, there are O (100~2000) MTs in a hydrocarbon mixture up to heavy oil. The variations of main SC are determined by the maximum length of one kind of side chain in a hydrocarbon mixture. Typically, the maximum length of a side chain is between 50~100. In reality, there is a distinct distribution of a main SC per each MT. However, it would require an impractical amount of computational resources to consider such a large combinatorial problem. From an engineering view, there are a few patterns of such main SC distributions in petroleum crude oil and refining conversions that can help reduce this combinatorial problem. The maturation of a crude oil significantly affects the main SC's distributions in crude and, thus, indirectly those in the derived products via upgrading processes (Tissot, Bernard P., and Dietrich H. Welte. Petroleum formation and occurrence. Springer Science & Business Media, 2013). Most complex MTs in a heavy oil are highly maturated structures and, as such, embodiments may simplify by applying a uniform distribution of side chains that are used by all MTs in a heavy oil. This reduces the variations of main SC to O (50~100) for each type of side chain. In addition, there is a finite number of types of side chains to consider in a refining process: paraffinic, olefinic, sulfide, amide, carboxyl acid, etc. Roughly, the maximum number of the types of side chains embodiments consider is O (5). In most cases, selecting one or a few types of side chains is acceptable and thus, the minimum number of the types of side chains is 1.

As a result, the variations of all types of main SCs are O (50-500). Thus, embodiments can use O (150~2500) attribute values to describe millions of molecules in a heavy oil. The above described attribute representation not only effectively describes the molecules in heavy oil, but can also be extended to describe gas oil or even lighter fractions when very high computational performance is desired.

However, there are some important isomeric molecules (usually in the naphtha range) that cannot be simplified by this method because the substituents' effects are very important to selected processes such as catalytic reforming, (e.g. the xylene isomer ratio can be very important). Although the identification of isomers is not typically very important when upgrading a heavy fraction, embodiments consider how to keep/transfer those isomeric details when propagating a product stream from a heavy oil conversion (e.g., delayed coking) to a naphtha process (e.g., catalytic reforming). In addition, a uniform main SC distribution may not be applicable for lighter fractions and thus, embodiments treat them individually based on retaining the information required by the user. As a result, a set of individual molecules is utilized in embodiments to describe important isomeric molecules in selected conversions of lighter fractions.

Embodiments apply a new hybrid ARM approach to describe the molecular components in a complex hydrocarbon mixture by combining the representation of heavier fractions via sampling of the attribute probability density functions (pdfs) and the representation of individual molecules for lighter fractions together. The molecular compositions of the hybrid ARM can be described as a set of homologous series as illustrated in MB EORXR. However, the table 660 of the homologous series is updated as shown in FIG. 6.

Each column 661*a-n* of FIG. 6 is used to describe a molecular type (MT). A MT contains the aggregated ring structures and the substituent methyl groups, which can reveal many of the important criteria in refining conversions (reactivity, thermodynamics, properties, e.g., physical properties, cetane number, and octane number, etc.). The rows 662*a-n* of each MT 661*a-n* are the main SC extension. The maximum length can be determined based on the analytical chemistry of the sample. The entire table is divided into two regions: Individual Molecule (IM) region 663 and ARM region 664. Two kinds of criteria are provided to users to adjust the area of the IM region 663 and the ARM region 664. The first one is a minimum-ring criterion 665 (vertical line in FIG. 6) as the combination of total ring number, aromatic ring number and DBE (double bond equivalent) that is used to classify MTs in IM region 663 or ARM region 664. The second criterion is a minimum main SC length 666 (horizontal line in FIG. 6). If both criteria of a species are satisfied, it is in the ARM region 664. Otherwise, that species is in the IM region 663. As shown in FIG. 6, the bottom-right part of the table 660 is the ARM region 664, and the other part of the table 660 is the IM region 663. The non-ring species (e.g., paraffins) can be set as a default to belong to the IM region 663. The ARM region 664 represents the heavier fractions of a hydrocarbon mixture. The species in the IM region 663 can have distinct distributions of side chains. Embodiments can impose another isomeric distribution $f_{isom}$ to identify the isomers in the same molecular component in terms of MT and main SC length. For example, dimethyl benzene is one cell in FIG. 6, e.g., the cell 667 in the example where 662*a* represents a main SC of 1. Three isomers of dimethyl benzene: p-xylene, o-xylene, and m-xylene can be differentiated by $f_{isom}$ and $f_{isom}$ can be determined by knowledge of kinetics, thermodynamics, and refinery processes. Consequently, the hybrid ARM approach not only describes the heavy oils in terms of a limited number of MTs and main SCs, but also represents the lighter molecules in terms of individual side chains and isomeric details, and thus, it is an optimal molecular representation for the entire range of petroleum hydrocarbon mixtures.

After determining the molecular components by the above hybrid approach, embodiments can continue to model the kinetics in a reactor effectively. Instead of describing every reaction by individual molecules, embodiments model the reactions involved with species in the ARM region in terms of two kinds of attributes: MT and main SC respectively. The reactions involved with species only in the IM region are still modeled in the conventional way, e.g., representing the reactions in terms of individual molecules.

Figure 7:
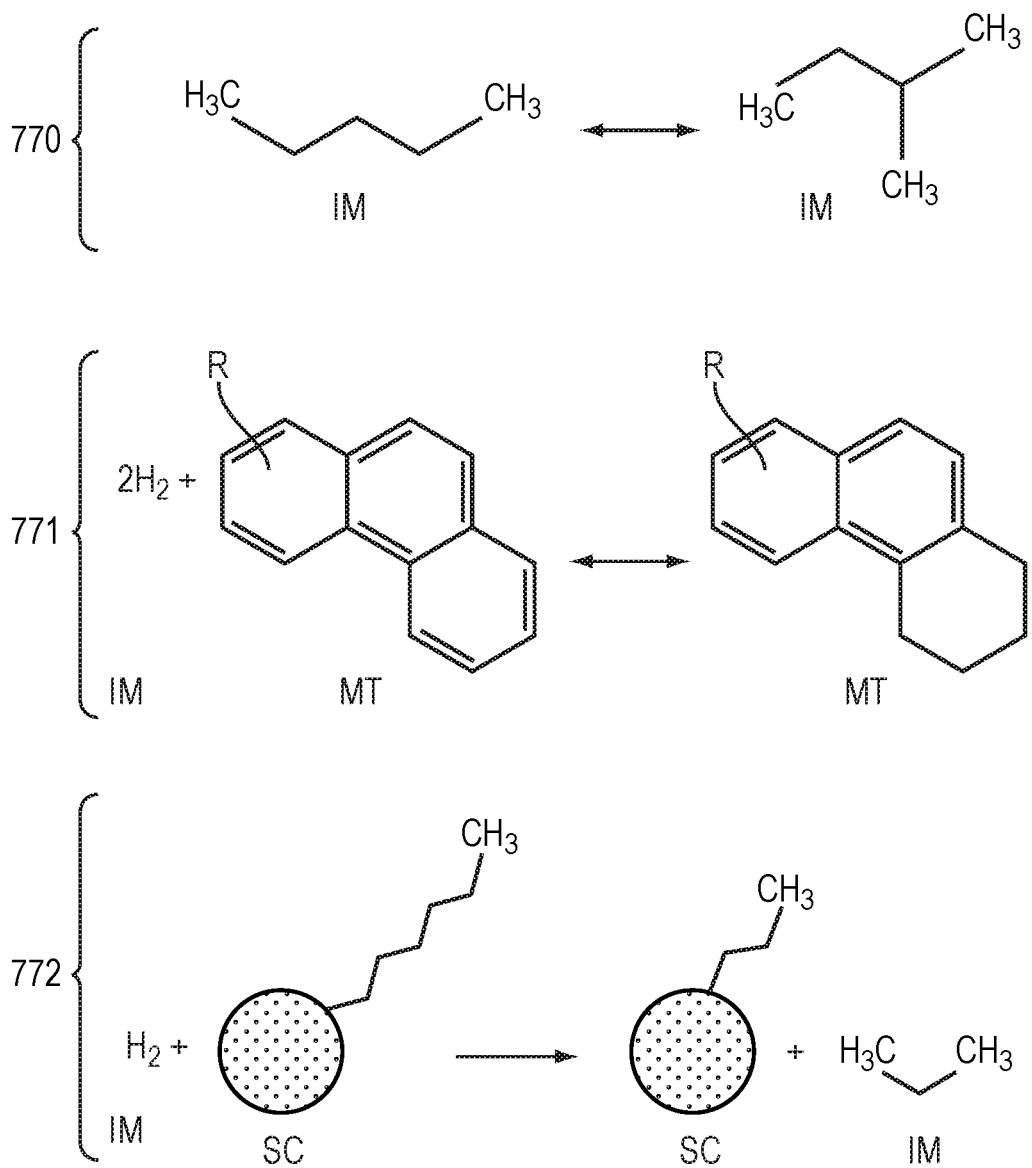
FIG. 7 depicts reactions that are simulated by embodiments.

FIG. 7 depicts the concept of reactions in embodiments that implement a hybrid ARM approach. The first reaction 770 in FIG. 7 is an example of paraffin isomerization and the reaction 770 represents the reactions in which species are solely in the IM region 663. The other two reactions, 771 and 772, in FIG. 7 are the reactions in which species are in the ARM region 664. In an embodiment, the reactions are written in terms of attributes rather than individual species. The second reaction 771 is an example of aromatic saturation in terms of MT attributes: tri-aromatic ring and di-aromatic ring fused with a naphthenic ring. The third reaction 772 is an example of side chain cracking in terms of main SC (side chain) attributes: SC6 (the length of SC is 6) and SC3 (the length of SC is 3). The species in the IM region can appear in any individual molecule reactions and any attribute reactions. MTs and SCs react respectively only in attribute reactions. In other words, MTs and SCs are not allowed to be expressed together in the same reaction. In addition, the left-hand side (LHS) and right-hand side (RHS) of one reaction are only allowed to have one MT or SC. As a result, the mass balance equations in a reactor can be written as Eq. 1-6 below:

$$\frac{dF_{IM_i}}{dV} = \sum_j a_j \cdot r_{IM_j} + \sum_k b_k \cdot r_{MT_k} + \sum_l c_l \cdot r_{SC_l} \quad \text{Eq. 1}$$

$$\frac{dF_{MT_i}}{dV} = \sum_k bb_k \cdot r_{MT_k} \quad \text{Eq. 2}$$

$$\frac{dF_{SC}}{dV} = \sum_l cc_l \cdot r_{SC_l} \quad \text{Eq. 3}$$

$$F_{total_{IM}} = \sum_i F_{IM_i} \quad \text{Eq. 4}$$

$$F_{total_{Att}} = \sum_j F_{SC_j} = \sum_i F_{MT_i} \quad \text{Eq. 5}$$

$$F_{total} = F_{total_{IM}} + F_{total_{Att}} \quad \text{Eq. 6}$$

$a_j$, $b_k$, $c_l$ the stoichiometric coefficients of IM species in reactions $bb_k$ the stoichiometric coefficients of MT species in reactions $cc_l$ the stoichiometric coefficients of SC species in reactions $r_{IM_j}$ the kinetic rates of the reactions involved with $IM_j$
$r_{MT_k}$ the kinetic rates of the reactions involved with $MT_k$
$r_{SC_l}$ the kinetic rates of the reactions involved with $SC_l$
$F_{MT_i}$ the mole flow of a given $MT_i$
$F_{SC_j}$ the mole flow of a given $SC_j$
$F_{IM_i}$ the mole flow of a given $IM_i$
$F_{total_{IM}}$ the total mole flow of IM
$F_{total_{Att}}$ the total mole flow of attributes
V the volume of the reactor The mass balance equations of the IM species (Equation 1) contain the rates of individual reactions and attribute reactions (MT and SC). The mass balance equations of MT attributes (Equation 2) only contain the rates of the attribute reactions in terms of MTs; and the mass balance equations of SC attributes (Equation 3) only contain the rates of the attribute reactions in terms of SCs. The total mole flow of all IMs is called $F_{total_{IM}}$ (Equation 4). The total mole flow of all MTs is equal to the total mole flow of all SCs and is named as the total mole flow of attributes: $F_{total_{Att}}$ (Equation 5). The total mole flow of all species in a reactor: $F_{total}$ is the sum of $F_{total_{IM}}$ and $F_{total_{Att}}$ (Equation 6).

After the integration of the reactor model, an embodiment samples all individual species derived from the reactions in the ARM region 664 to propagate the entire molecular composition to the downstream unit operations or estimate selected product properties. Eq. 7 shows how to calculate the composition of the post-reaction species by sampling the probability density functions for MTs and SCs:

$$F_{SPC_{MT_i SC_j}} = f_{isom} \cdot F_{total_{Att}} \cdot \frac{F_{MT_i}}{\sum_i F_{MT_i}} \cdot \frac{F_{SC_j}}{\sum_j F_{SC_j}} = f_{isom} \cdot \frac{F_{MT_i} \cdot F_{SC_j}}{F_{total_{Att}}} \quad \text{EQ. 7}$$

$f_{isom}$ the isomeric distribution of individual molecules
$F_{MT_i}$ the mole flow of a given $MT_i$
$F_{SC_j}$ the mole flow of a given $SC_j$ For example, in a MB Hydrocracker (HCR) model, if a $MT_i$ is a single aromatic ring substituted with one methyl group that is derived from the aromatic saturation and ring opening reactions, and $SC_i$ is a main SC with a length equal to 1 that is derived from side chain cracking, the mole flow of the component defined by them, dimethyl benzene produced by upgrading heavier fractions in the ARM region, can be calculated by multiplying $F_{total_{Att}}$ with the probability of the $MT_i$ in $F_{MT_i}$ (mole fraction) and the probability of the $SC_j$ in $F_{SC_j}$ (mole fraction). If the light product of a MB HCR model needs to be propagated to a naphtha continuous catalyst regeneration (CCR) reformer, the individual isomers of the dimethyl benzene (p-xylene, o-xylene, and m-xylene) need to be considered. In Eq. 7, an isomeric distribution $f_{isom}$ is imposed as an additional multiplier to the mole flow of the dimethyl benzene to calculate the mole flow of three xylenes. $f_{isom}$ is determined by knowledge of kinetics, thermodynamics, and refining process. In an example embodiment, $f_{isom}$ is based on chemistries and models and users can set up a model to specify. As such, in an embodiment, $f_{isom}$ is an input variable for users' specifications. In a HCR process, the rates of the aromatic methyl shift reaction that determine the distributions of the three xylenes are usually significantly faster than those of other reactions such as cracking, saturation, etc. Thus, embodiments can apply a virtual equilibrium approximation to the aromatic methyl shift reaction. As a result, an isomeric distribution constrained by their thermodynamic equilibrium can be derived and used in the model. According to an embodiment, for middle or heavier products that do not require differentiation of individual isomers, $f_{isom}$ is set to 1. The post-reaction results from the individual reactions in the IM region 663 are then combined with the post reaction species sampled out from ARM reactions to determine the entire molecular details of the products from the hybrid ARM approach.

Depending on a user's interests, there are typically O (50-1000) species in the IM region 663 and the number of reactants and products of the reactions in the IM region is O (50-1000). As discussed above, in a typical refining reactor, there are usually O (100-2000) MTs including the molecular type in the original feedstock and the molecular types produced by reaction in products. In addition, there are usually O (50-500) main SCs. The number of reactants and products of the reactions in the ARM region 664 is the total number of MTs and SCs: O (150-2500) attributes. The total number of reactants and products in all reactions to use in a reactor model is O (200-3500) by the hybrid ARM approach. If an embodiment models the reactor as only individual molecules, the number of reactants and products to consider is O (5000-10^6). Thus, the hybrid ARM approach can significantly reduce the computational burden. Conceptually, if there are N MTs and M main SCs in an ARM region 664, the hybrid ARM approach can use only N+M variables to represent the N*M molecules in the ARM region of a reactor model while maintaining full molecular details including individual isomers.

Figure 8:
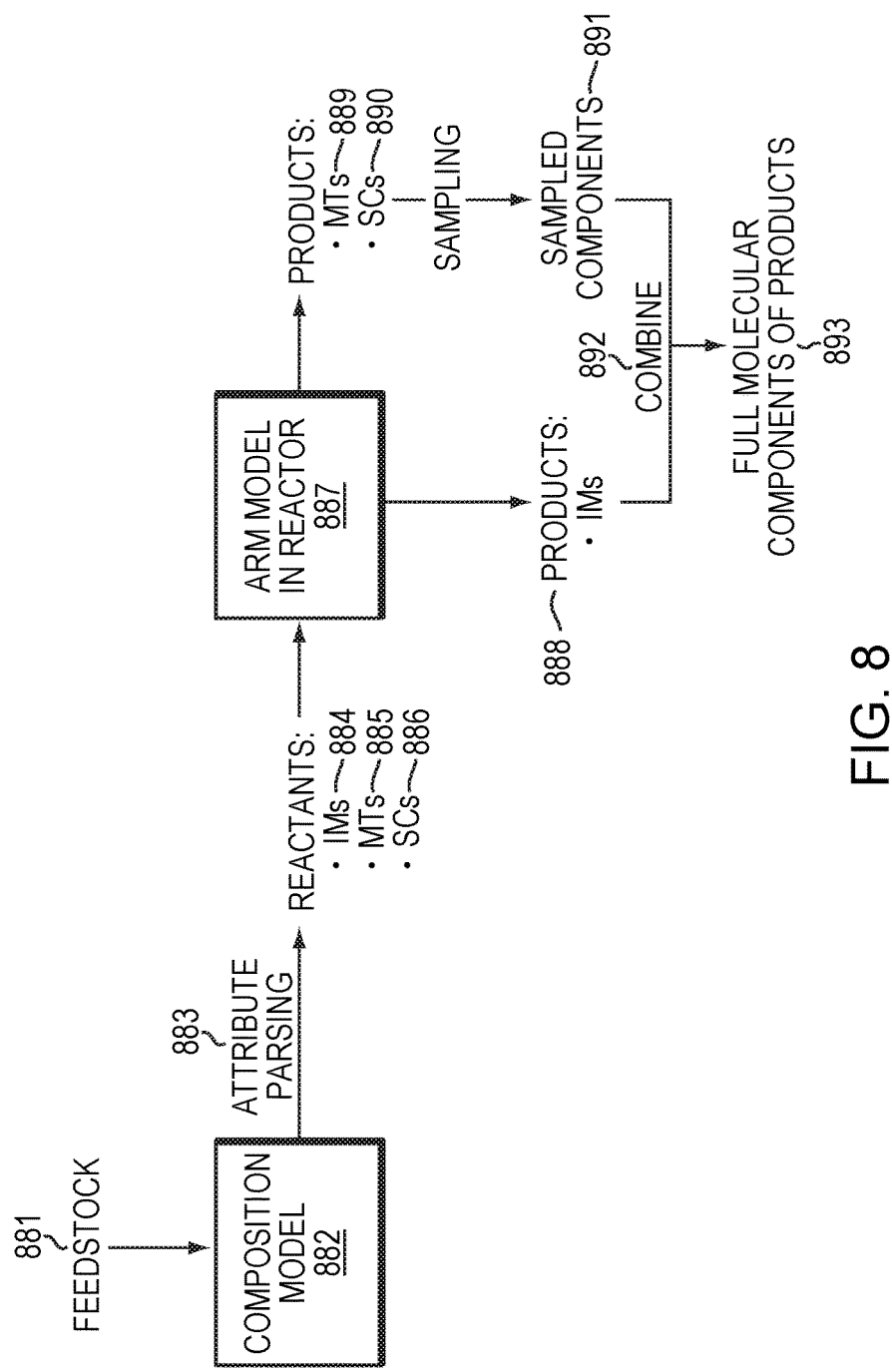
FIG. 8 is a flowchart of an embodiment for simulating a chemical reaction to determine products of the reaction.

FIG. 8 shows the workflow 880 of an embodiment of the present invention providing a hybrid ARM in Aspen Technology, Inc.'s (Assignee's) MB reactor. In the workflow 880, the feedstock 881 is characterized by the composition model (e.g., Aspen Technology, Inc.'s (Assignee's) Molecular Characterization of U.S. patent application Ser. No. 15/961,310) 882 first and converted into a set of molecular compositions. Using the ARM criteria selected by a user, an MB reactor parses 883 those molecular compositions to a set of IM species 884 and two kinds of attribute values: MTs (molecular types) 885 and SCs (side chains) 886. Then, IMs 884, MTs 885, and SCs 886 of reactants are transferred into the hybrid ARM model 887 as input values. A simulation is performed with the hybrid ARM model 887 in the MB reactor and, after, the simulation in the MB reactor, the output values from the hybrid ARM are the IMs (individual molecules) 888, MTs 889, and SCs 890 of the products. MTs 889 and SCs 890 of the products are sampled 891 into a set of components and then combined 892 with IMs 888 to generate the full molecular compositions 893 of the products of the MB reactor.

Embodiments may employ an energy balance equation and a momentum balance equation for the hybrid ARM model that is similar to the approach in MB EORXR. The energy balance equation is shown in Eq. 8 below and the momentum balance equations are shown below in Eqs. 9 and 10.

$$\frac{dT}{dV} = \frac{1}{F_{total} \cdot MixCp} \sum r_i \cdot (-\Delta H_{rxn_i}) + UA(T - T_c) \quad \text{Eq. 8}$$

T is the temperature in the reactor bed
$F_{total}$ is the total mole flow rate in the reactor bed
V is the volume of the reactor bed
$r_i$ is the reaction rate of reaction i and $\Delta H_{rxn_i}$ is the enthalpy change of reaction i
UA is the heat transfer coefficient to the environment and $T_c$ is the environment temperature
For an adiabatic reactor (e.g. HCR), the second term of Eq. 8 can be ignored.

$$\frac{dP}{dZ} = -f \cdot \frac{\rho \cdot u_s^2}{d_p} \qquad \text{Eq. 9}$$

$$f = \frac{1-\varepsilon}{\varepsilon^3} \cdot \left(1.75a + 150b\frac{(1-\varepsilon)}{Re}\right) \qquad \text{Eq. 10}$$

P is the pressure in the reactor bed
$\rho$ is the density of the stream
$u_s$ is the superficial velocity
$d_p$ is the diameter of the catalyst particle in the reactor bed
$\varepsilon$ is the void fraction of a reactor bed
f is the friction factor
Re is Reynold number
a and b are the turbulent and laminar correction coefficients. By default, a=b=1
Z is the dimensionless length of the reactor In an embodiment, the hybrid ARM model is incorporated into the MB EORXR builder. As a result, the residuals, analytical jacobians, and sparsity of the hybrid ARM model, the mass balance equations in Eq. 1-6, the energy balance equations in Eq.8, the momentum balance equations in Eq. 9-10, and the sampling process in Eq. 7 are automatically generated. In addition, the classification of the IM region and ARM region can be automated by MB EORXR builder from the criteria of user input.

Table 2 below lists a set of selected thermodynamics properties and physical properties used in MB EORXR. Because the reactions and species in the ARM region 664 are represented by two attributes: MTs and SCs, the property estimations of the reactions and species in the ARM region used in Eq. 1 to Eq.10 are calculated from those attributes instead of individual molecules. The structural attribute (MT or SC) is a piece of a molecular structure. The method to obtain those properties is similar to the functionality used to calculate individual components. The properties of structural information can be directly parsed from the attributes' structures. Embodiments may use the group contribution method (e.g., Benson method) to estimate the thermodynamics properties in Table 2. Instead of counting the structural functional groups of a molecule, an embodiment adjusts these methods to use the structural fragments of an attribute: MT or SC.

TABLE 2

The molecular property used in MB EORXR

| MW | Density |
|---|---|
| CarbonNum | Hform |
| HydrogenNum | Gform |
| SideChainNum | Cp_a |
| AromRingNum | Cp_b |
| NaphRingNum | Cp_c |
| ThphRingNum | Cp_d |
| PyrrolicRingNum | HVap |
| PyrridenicRingNum | HfLiq |
| TotalSulfur | CpLiq_a |

TABLE 2-continued

The molecular property used in MB EORXR

| MW | Density |
|---|---|
| TotalNitrogen | CpLiq_b |
| TotalOxygen | CpLiq_c |
| AromCarbonNum | MolNum |
| NaphCarbonNum | ViscA |
| ParCarbonNum | ViscB |
| Naph6Ring | ViscC |
| Naph5Ring | ViscD |
| Tb | Core |

Embodiments have been validated to verify utilizing individual molecule representations and molecular attribute representations for simulating feedstocks. For instance, one such validation of the hybrid ARM approach, used Aspen Technology, Inc.'s (Assignee's) MB HCR for a performance test and compared the solution time, the scale, and the accuracy of the model. The examples picked are a single hydroprocessing bed model of VGO and a single stage hydrocracker model of VGO that consists of two treating beds and two cracking beds. The models were simulated with full detailed components without any reduction (called full model) and then calculated by the hybrid ARM method (called ARM model). The validation simulated 9 scenarios of ARM models by setting different ARM criteria to compare the effects of ARM reduction in terms of different granularity. Table 3 below shows the descriptions of 9 ARM models based on different ARM criteria.

TABLE 3

The notation of nine hybrid ARM models

| Scenarios | Description |
|---|---|
| Ring3SC8 | Minimum Ring Number of ARM Region is 3; minimum SC length of ARM region is 8 |
| Ring3SC4 | Minimum Ring Number of ARM Region is 3; minimum SC length of ARM region is 4 |
| Ring3SC0 | Minimum Ring Number of ARM Region is 3; minimum SC length of ARM region is 0 |
| Ring2SC8 | Minimum Ring Number of ARM Region is 2; minimum SC length of ARM region is 8 |
| Ring2SC4 | Minimum Ring Number of ARM Region is 2; minimum SC length of ARM region is 4 |
| Ring2SC0 | Minimum Ring Number of ARM Region is 2; minimum SC length of ARM region is 0 |
| Ring1SC8 | Minimum Ring Number of ARM Region is 1; minimum SC length of ARM region is 8 |
| Ring1SC4 | Minimum Ring Number of ARM Region is 1; minimum SC length of ARM region is 4 |
| Ring1SC0 | Minimum Ring Number of ARM Region is 1; minimum SC length of ARM region is 0 |

The statistics of the computational demand of a single hydroprocessing bed VGO model are shown in Table 4.

TABLE 4

The computational demand of a single hydroprocessing bed model

| Model | Solution Time (sec) | # of Variables | # of Equation | # of Non Zeros |
|---|---|---|---|---|
| Ring3SC8 | 16.35 | 224726 | 219247 | 1818426 |
| Ring3SC4 | 12.69 | 200210 | 193839 | 1624434 |
| Ring3SC0 | 12.02 | 195782 | 189147 | 1591656 |
| Ring2SC8 | 8.99 | 171506 | 164966 | 1363045 |
| Ring2SC4 | 5.75 | 138446 | 130874 | 1099209 |
| Ring2SC0 | 5.02 | 129914 | 122018 | 1035591 |

TABLE 4-continued

The computational demand of a single hydroprocessing bed model

| Model | Solution Time (sec) | # of Variables | # of Equation | # of Non Zeros |
|---|---|---|---|---|
| Ring1SC8 | 5.32 | 133874 | 126482 | 1026261 |
| Ring1SC4 | 2.75 | 96422 | 87921 | 726520 |
| Ring1SC0 | 2.74 | 85250 | 76386 | 643000 |
| Full Model | 31.13 | 293237 | 291200 | 2390080 |

Rows 1-3 of Table 4 show the results of ARM models with high granularity: the species in IM Region, e.g., 663, are up to diesel fractions. Rows 4-6 of Table 4 show the results of ARM models with medium granularity: the species in IM Region are up to naphtha fractions. Rows 7-9 of Table 4 show the results of ARM models with low granularity: the species in IM Region are only limited to a set of paraffins. The last row is the result of the full model. From Table 4, it can be seen that the computational demand of a VGO single hydroprocessing bed model can be reduced significantly by the hybrid ARM model, and the solution time of a VGO single hydroprocessing bed model can be reduced from 31.13 seconds to 2.74 seconds in the scenario of Ring1SC0. The ARM models are as easy to converge as the full model in Aspen Technology, Inc.'s (Assignee's) EO engine and additional creep steps are not required.

In addition to the comparison of the computational performance, the accuracy of using the full model and the ARM model has also been evaluated to validate the ARM model. Selected properties of products were considered in the comparison such as: the distillation curve FIG. 9, the distribution of carbon number FIG. 10, the distribution of DBE FIG. 11, the global PIONA FIG. 12, and the weight-based yields FIG. 13. The results of the comparison of these selected properties of the product are shown in FIGS. 9-13.

Figure 9:
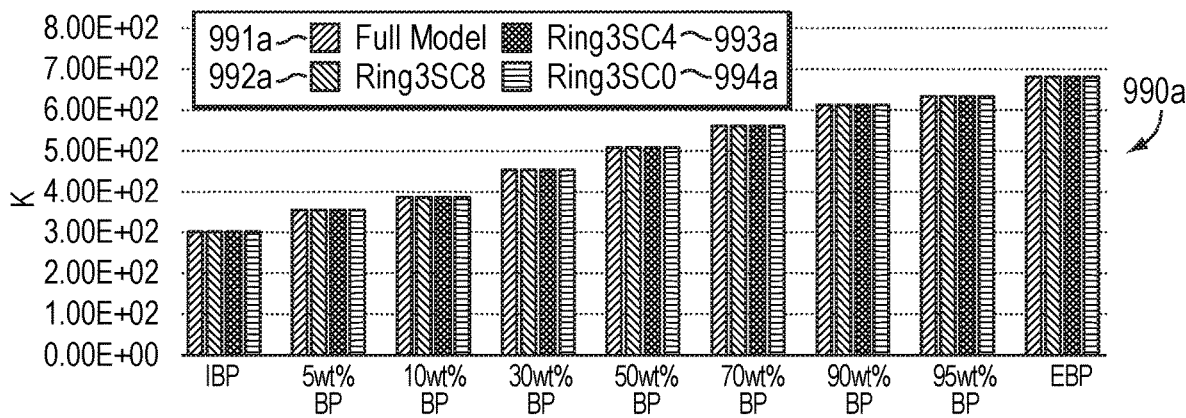
FIGS. 9-19 are plots comparing simulation results generated using a state of the art simulation method with simulation results generated using embodiments.
Figure 9:
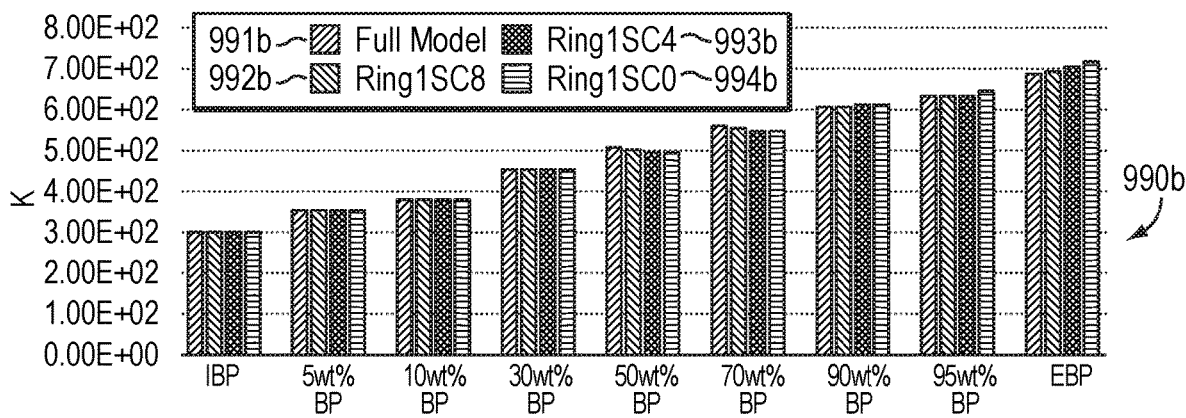
Figure 9:
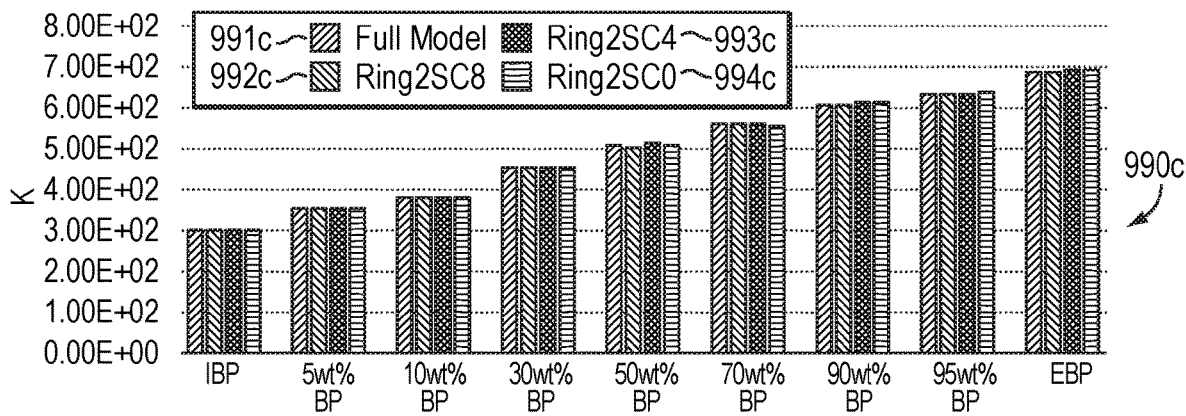

FIG. 9 shows the predicted distillation curves determined using full models and ARM models in a VGO single hydroprocessing bed model in the plots 990a-c. The plot 990a shows the predicted distillation curves determined using a full model 991a, Ring3SC8 model 992a, Ring3SC4 model 993a, and Ring3SC0 model 994a. The plot 990b shows the predicted distillation curves determined using a full model 991b, Ring1SC8 model 992b, Ring1SC4 model 993b, and Ring1SC0 model 994b. The plot 990c shows the predicted distillation curves determined using a full model 991c, Ring2SC8 model 992c, Ring2SC4 model 993c, and Ring2SC0 model 994c.

Figure 10:
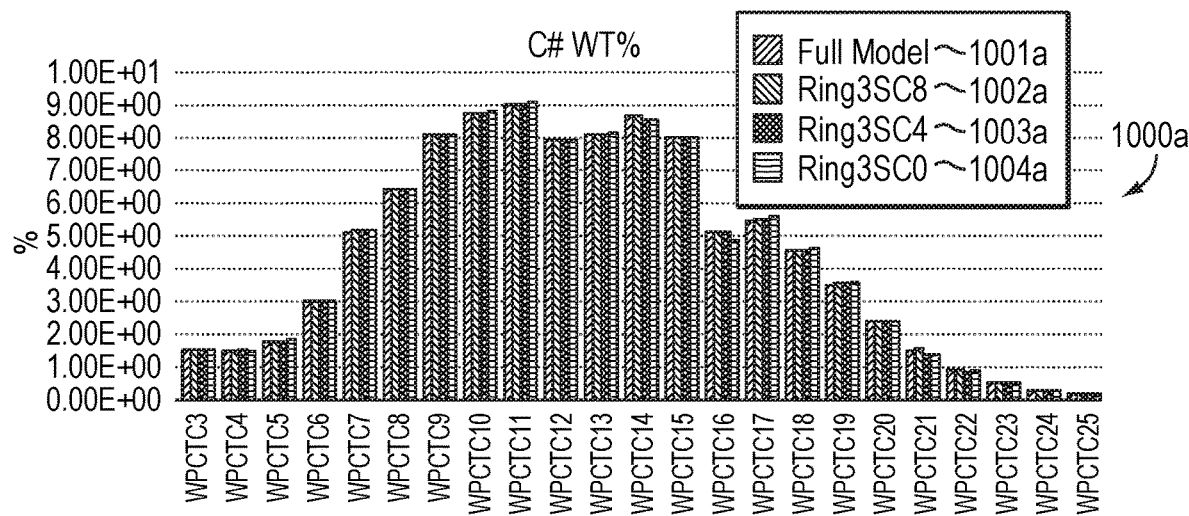
Figure 10:
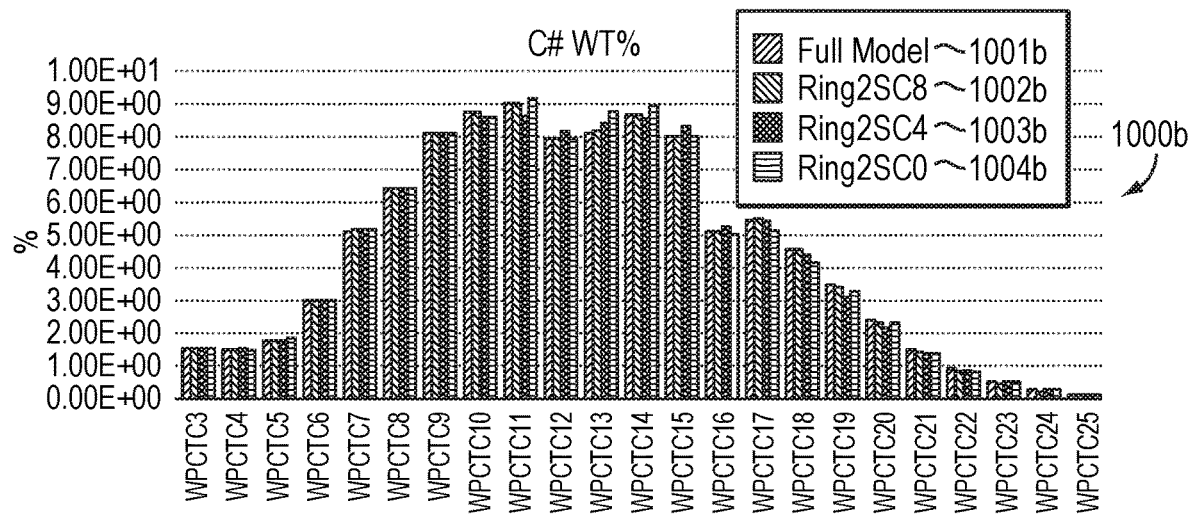
Figure 10:
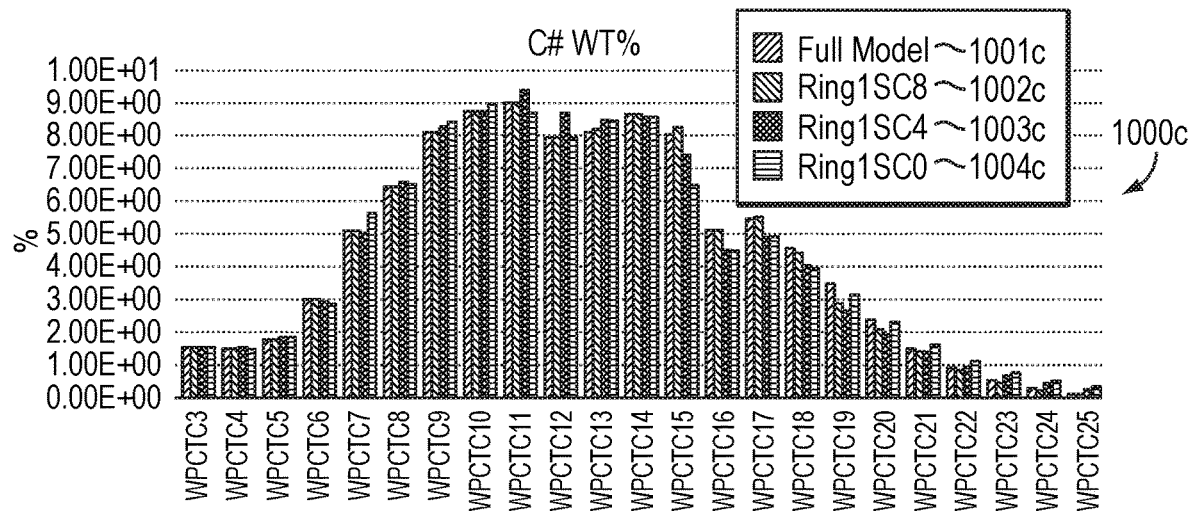

FIG. 10 shows the predicted distribution of carbon number determined using full models and ARM models in a VGO single hydroprocessing bed model in the plots 1000a-c. The plot 1000a shows the predicted distribution of carbon number determined using a full model 1001a, Ring3SC8 model 1002a, Ring3SC4 model 1003a, and Ring3SC0 model 1004a. The plot 1000b shows the predicted distribution of carbon number determined using a full model 1001b, Ring2SC8 model 1002b, Ring2SC4 model 1003b, and Ring2SC0 model 1004b. The plot 1000c shows the predicted distribution of carbon number determined using a full model 1001c, Ring1SC8 model 1002c, Ring1SC4 model 1003c, and Ring1SC0 model 1004c.

Figure 11:
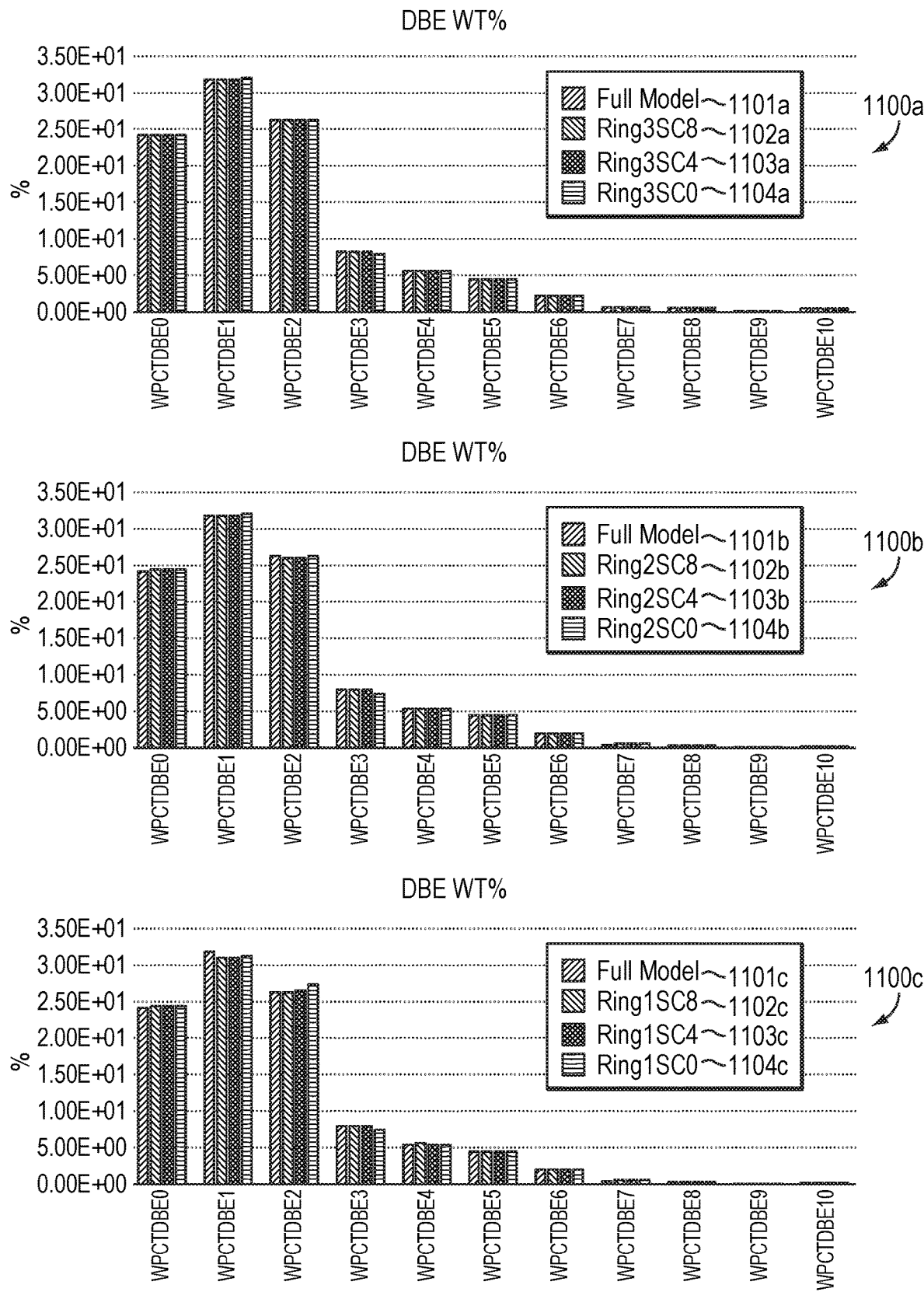

FIG. 11 shows the predicted distribution of DBE determined using full models and ARM models in a VGO single hydroprocessing bed model in the plots 1100a-c. The plot 1100a shows the predicted distribution of DBE determined using a full model 1101a, Ring3SC8 model 1102a, Ring3SC4 model 1103a, and Ring3SC0 model 1104a. The plot 1100b shows the predicted distribution of DBE determined using a full model 1101b, Ring2SC8 model 1102b, Ring2SC4 model 1103b, and Ring2SC0 model 1104b. The plot 1100c shows the predicted distribution of DBE determined using a full model 1101c, Ring1SC8 model 1102c, Ring1SC4 model 1103c, and Ring1SC0 model 1104c.

Figure 12:
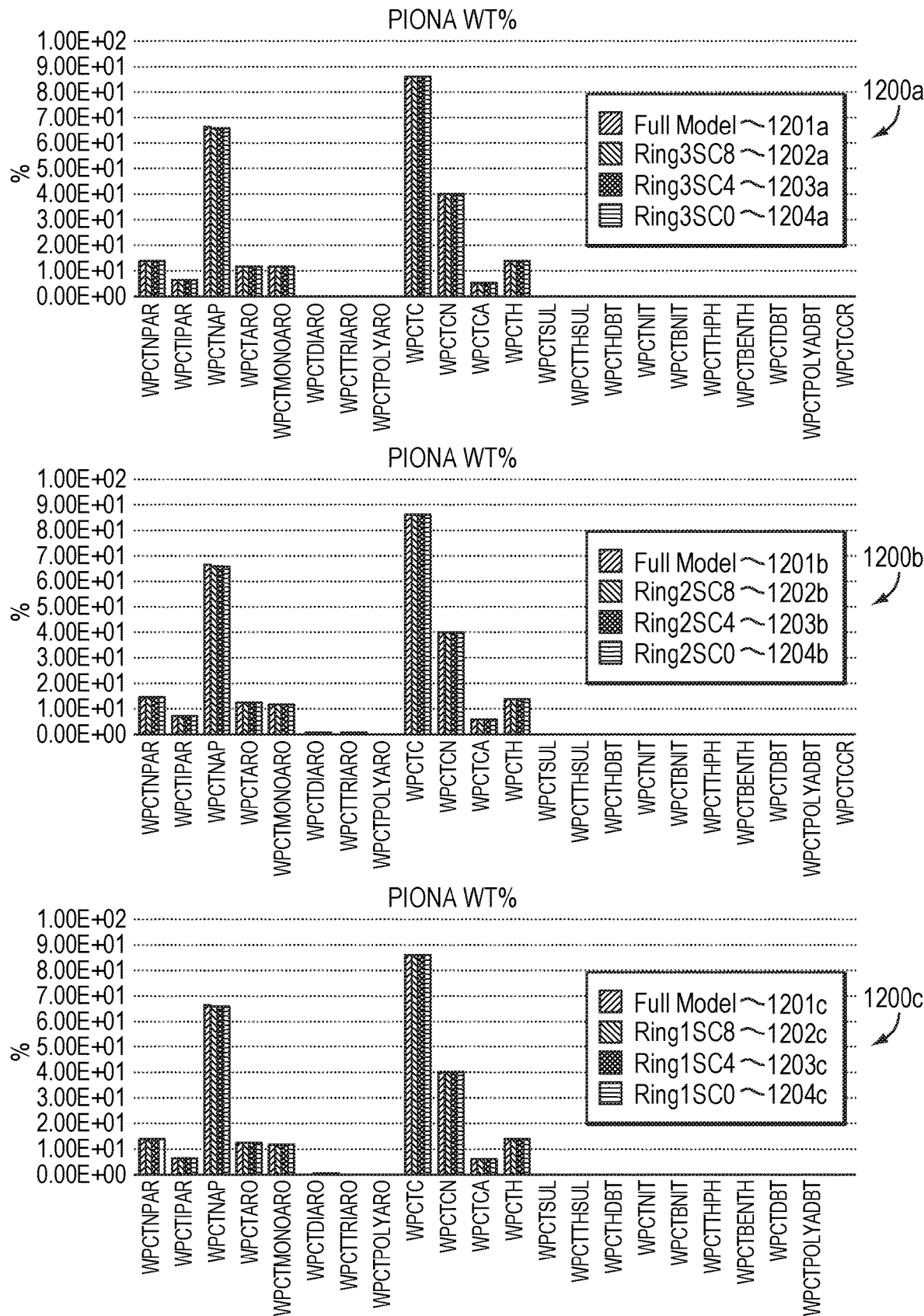

FIG. 12 shows the predicted PIONA weight fractions determined using full models and ARM models in a VGO single hydroprocessing bed model in the plots 1200a-c. The plot 1200a shows the predicted PIONA weight fractions determined using a full model 1201a, Ring3SC8 model 1202a, Ring3SC4 model 1203a, and Ring3SC0 model 1204a. The plot 1200b shows the predicted PIONA weight fractions determined using a full model 1201b, Ring2SC8 model 1202b, Ring2SC4 model 1203b, and Ring2SC0 model 1204b. The plot 1200c shows the predicted PIONA weight fractions determined using a full model 1201c, Ring1SC8 model 1202c, Ring1SC4 model 1203c, and Ring1SC0 model 1204c.

Figure 13:
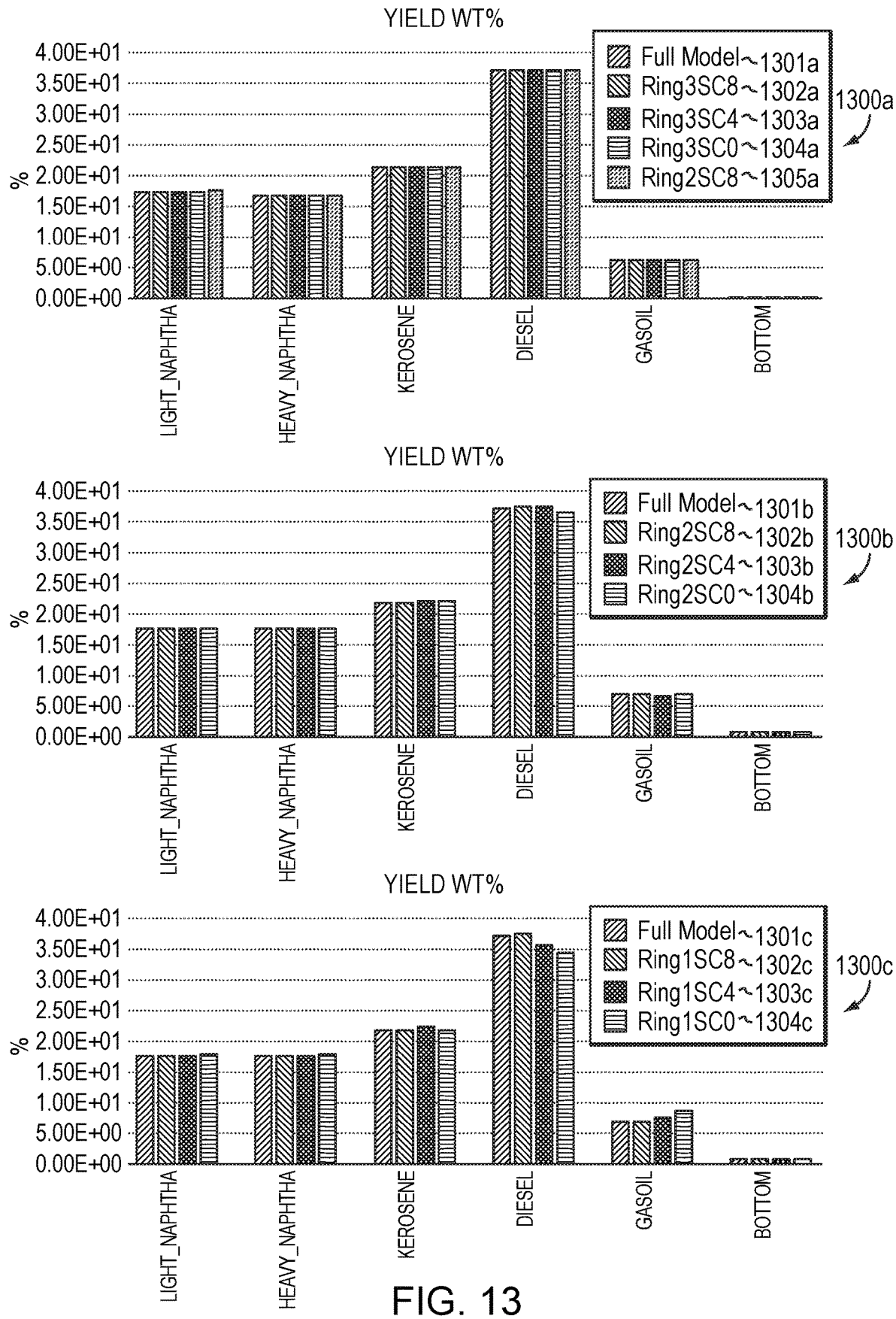

FIG. 13 shows the predicted yields determined using full models and ARM models in a VGO single hydroprocessing bed model in the plots 1300a-c. The plot 1300a shows the predicted yields determined using a full model 1301a, Ring3SC8 model 1302a, Ring3SC4 model 1303a, Ring3SC0 model 1304a, and Ring2SC8 model 1305a. The plot 1300b shows the predicted yields determined using a full model 1301b, Ring2SC8 model 1302b, Ring2SC4 model 1303b, and Ring2SC0 model 1304b. The plot 1300c shows the predicted yields determined using a full model 1301c, Ring1SC8 model 1302c, Ring1SC4 model 1303c, and Ring1SC0 model 1304c.

FIGS. 9-13 show that there is good agreement between the results of the full model and the ARM models. The higher granularity set in the ARM model, the better match between the results of the full models and the ARM models. R-square results for the ARM models compared to the full models for a VGO single hydroprocessing bed model are shown in Table 5.

TABLE 5

R-square results for ARM models compared to the full model for a VGO single hydroprocessing bed model

| RSQ | Distillation | PIONA | C# | DBE | Wt Yield |
|---|---|---|---|---|---|
| Ring3SC8 | 1.00 | 1.00 | 1.00 | 1.00 | 1.00 |
| Ring3SC4 | 1.00 | 1.00 | 1.00 | 1.00 | 1.00 |
| Ring3SC0 | 1.00 | 1.00 | 1.00 | 1.00 | 1.00 |
| Ring2SC8 | 1.00 | 1.00 | 1.00 | 1.00 | 1.00 |
| Ring2SC4 | 1.00 | 1.00 | 1.00 | 1.00 | 1.00 |
| Ring2SC0 | 1.00 | 1.00 | 0.99 | 1.00 | 1.00 |
| Ring1SC8 | 1.00 | 1.00 | 1.00 | 1.00 | 1.00 |
| Ring1SC4 | 1.00 | 1.00 | 0.99 | 1.00 | 0.99 |
| Ring1SC0 | 0.99 | 1.00 | 0.98 | 1.00 | 0.99 |

In this VGO single hydroprocessing bed model case, the results of which are shown in FIGS. 9-13, all scenarios of ARM models are close to that of the full model. The scenario of Ring1SC0 gives the best computational performance: almost 15 times faster than the full model.

Embodiments were also validated for a second case simulating a hydrocracker model including two treating beds and two cracking beds. The statistics of the computational demand of a VGO MB hydrocracker model are shown in Table 6.

TABLE 6

The computational burden of a VGO MB hydrocracker model

| Model | Solution Time (sec) | # of Variables | # of Equation | # of Non Zeros |
|---|---|---|---|---|
| Ring3SC8 | 222.55 | 907452 | 825006 | 6569376 |
| Ring3SC4 | 199.13 | 809388 | 726942 | 5806880 |
| Ring3SC0 | 136.54 | 792924 | 710478 | 5688488 |
| Ring2SC8 | 121.84 | 694572 | 612126 | 4794780 |
| Ring2SC4 | 65.03 | 562332 | 479886 | 3763628 |
| Ring2SC0 | 61.47 | 536748 | 454302 | 3506456 |
| Ring1SC8 | 92.59 | 544044 | 461598 | 3488540 |
| Ring1SC4 | 33.91 | 394236 | 311790 | 2317464 |
| Ring1SC0 | 20.45 | 350796 | 268350 | 2000280 |
| Full Model | 378.81 | 1181576 | 1117862 | 8794344 |

Rows 1-3 of Table 6 show the results of ARM models with high granularity: the species in the IM Region are up to diesel fractions. Rows 4-6 of Table 6 show the results of ARM models with medium granularity: the species in the IM Region are up to naphtha fractions. Rows 7-9 of Table 6 show the results of ARM models with low granularity: the species in the IM Region are only limited to a set of paraffinics. The last row is the result of the full model. From Table 6, it can be seen that the computational demand of a VGO MB hydrocracker model can be reduced significantly by the hybrid ARM model, and the solution time of a VGO MB hydrocracker model can be reduced from 378.81 seconds to 20.45 seconds in the scenario of Ring1SC0. The ARM models are as easy to converge as the full model in Aspen Technology, Inc.'s (Assignee's) EO engine, and more creep steps are not required.

In addition to the comparison of the computational performance, the accuracy of the full model and the ARM models in VGO MB hydrocracker example were also validated. Selected properties of the products were considered in the comparison such as: the distillation curve FIG. 14, the distribution of carbon number FIG. 15, the distribution of DBE FIG. 16, the global PIONA FIG. 17, the weight-based yields FIG. 18, and the reactor outlet temperatures FIG. 19. The results of the comparison of the selected properties of the product are shown in FIGS. 14-19.

Figure 14:
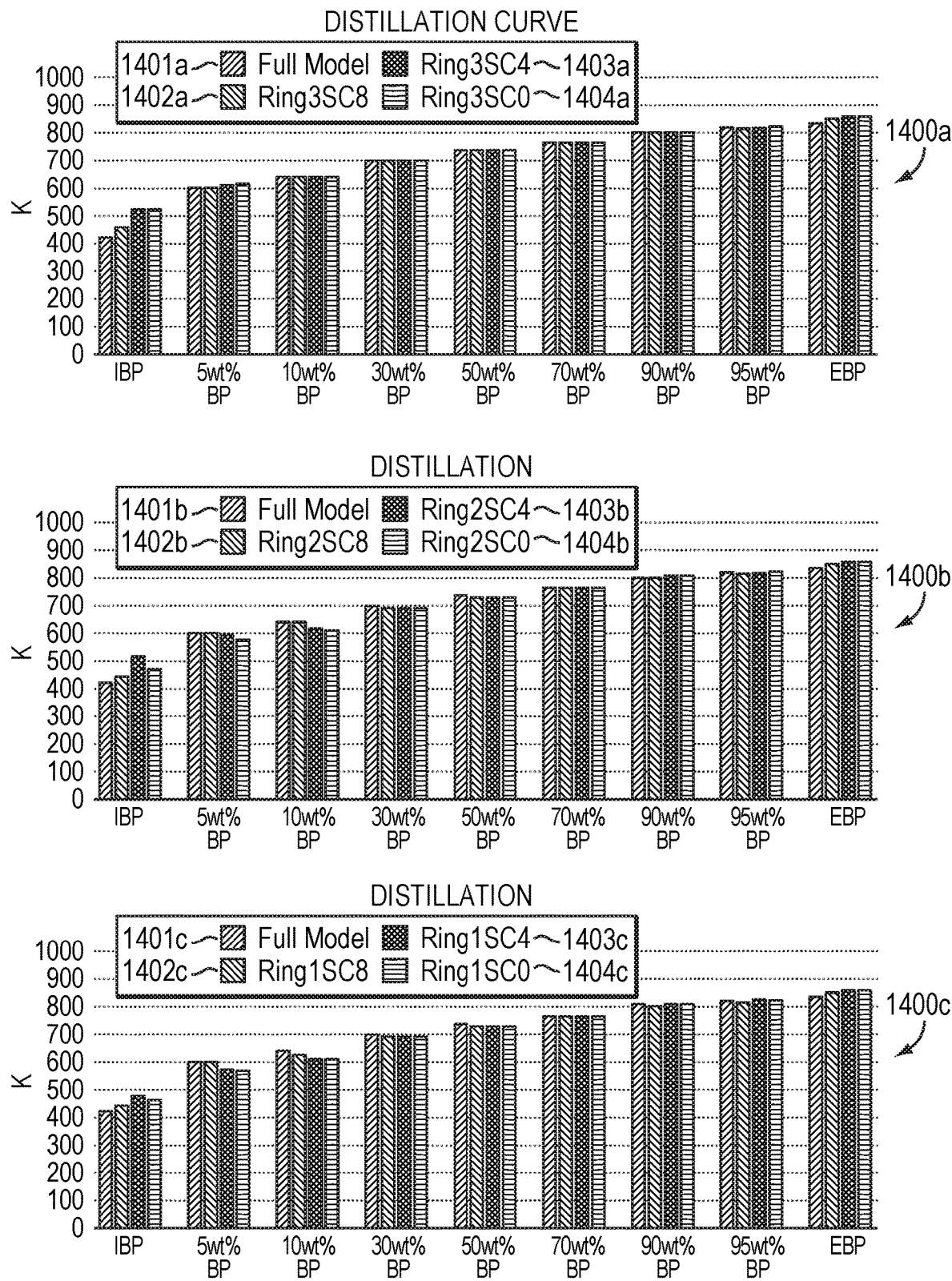

FIG. 14 shows the predicted distillation curves determined using full models and ARM models in a VGO MB hydrocracker model in the plots 1400a-c. The plot 1400a shows the predicted distillation curves determined using a full model 1401a, Ring3SC8 model 1402a, Ring3SC4 model 1403a, and Ring3SC0 model 1404a. The plot 1400b shows the predicted distillation curves determined using a full model 1401b, Ring2SC8 model 1402b, Ring2SC4 model 1403b, and Ring2SC0 model 1404b. The plot 1400c shows the predicted distillation curves determined using a full model 1401c, Ring1SC8 model 1402c, Ring1SC4 model 1403c, and Ring1SC0 model 1404c.

Figure 15:
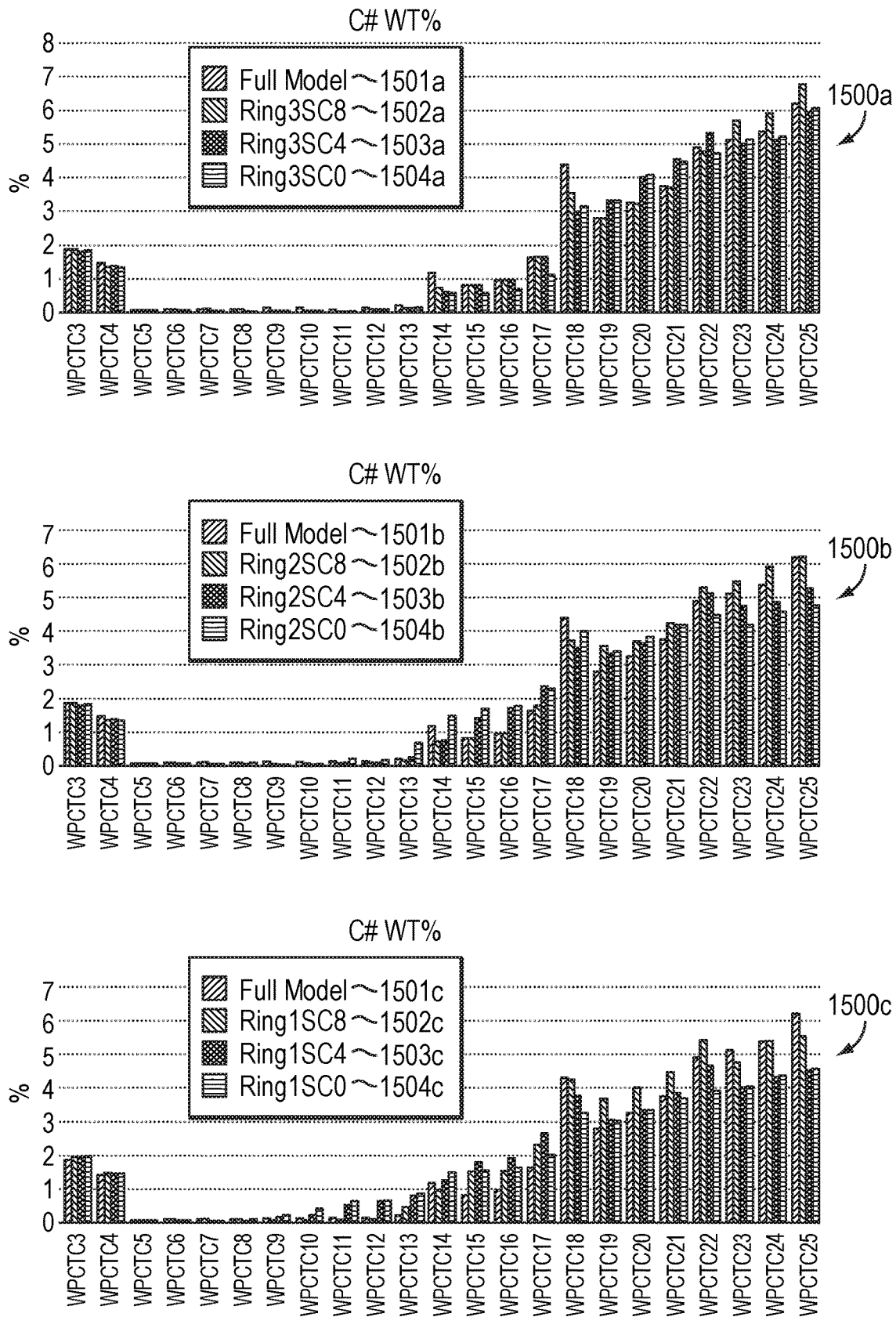

FIG. 15 shows the predicted distribution of carbon number determined using full models and ARM models in a VGO MB hydrocracker model in the plots 1500a-c. The plot 1500a shows the predicted distribution of carbon number determined using a full model 1501a, Ring3SC8 model 1502a, Ring3SC4 model 1503a, and Ring3SC0 model 1504a. The plot 1500b shows the predicted distribution of carbon number determined using a full model 1501b, Ring2SC8 model 1502b, Ring2SC4 model 1503b, and Ring2SC0 model 1504b. The plot 1500c shows the predicted distribution of carbon number determined using a full model 1501c, Ring1SC8 model 1502c, Ring1SC4 model 1503c, and Ring1SC0 model 1504c.

Figure 16:
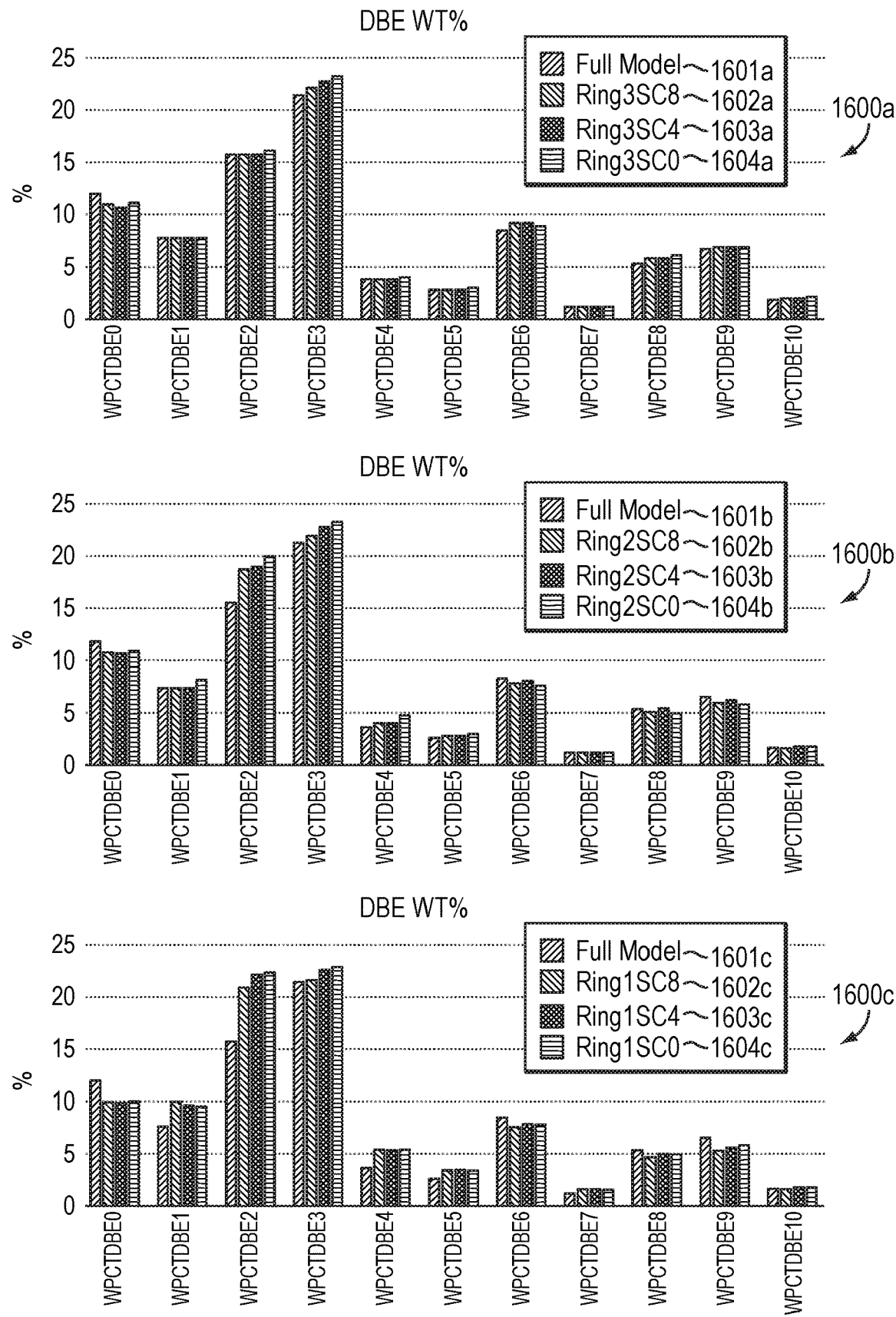

FIG. 16 shows the predicted distribution of DBE determined using full models and ARM models in a VGO MB hydrocracker model in the plots 1600a-c. The plot 1600a shows the predicted distribution of DBE determined using a full model 1601a, Ring3SC8 model 1602a, Ring3SC4 model 1603a, and Ring3SC0 model 1604a. The plot 1600b shows the predicted distribution of DBE determined using a full model 1601b, Ring2SC8 model 1602b, Ring2SC4 model 1603b, and Ring2SC0 model 1604b. The plot 1600c shows the predicted distribution of DBE determined using a full model 1601c, Ring1SC8 model 1602c, Ring1SC4 model 1603c, and Ring1SC0 model 1604c.

Figure 17:
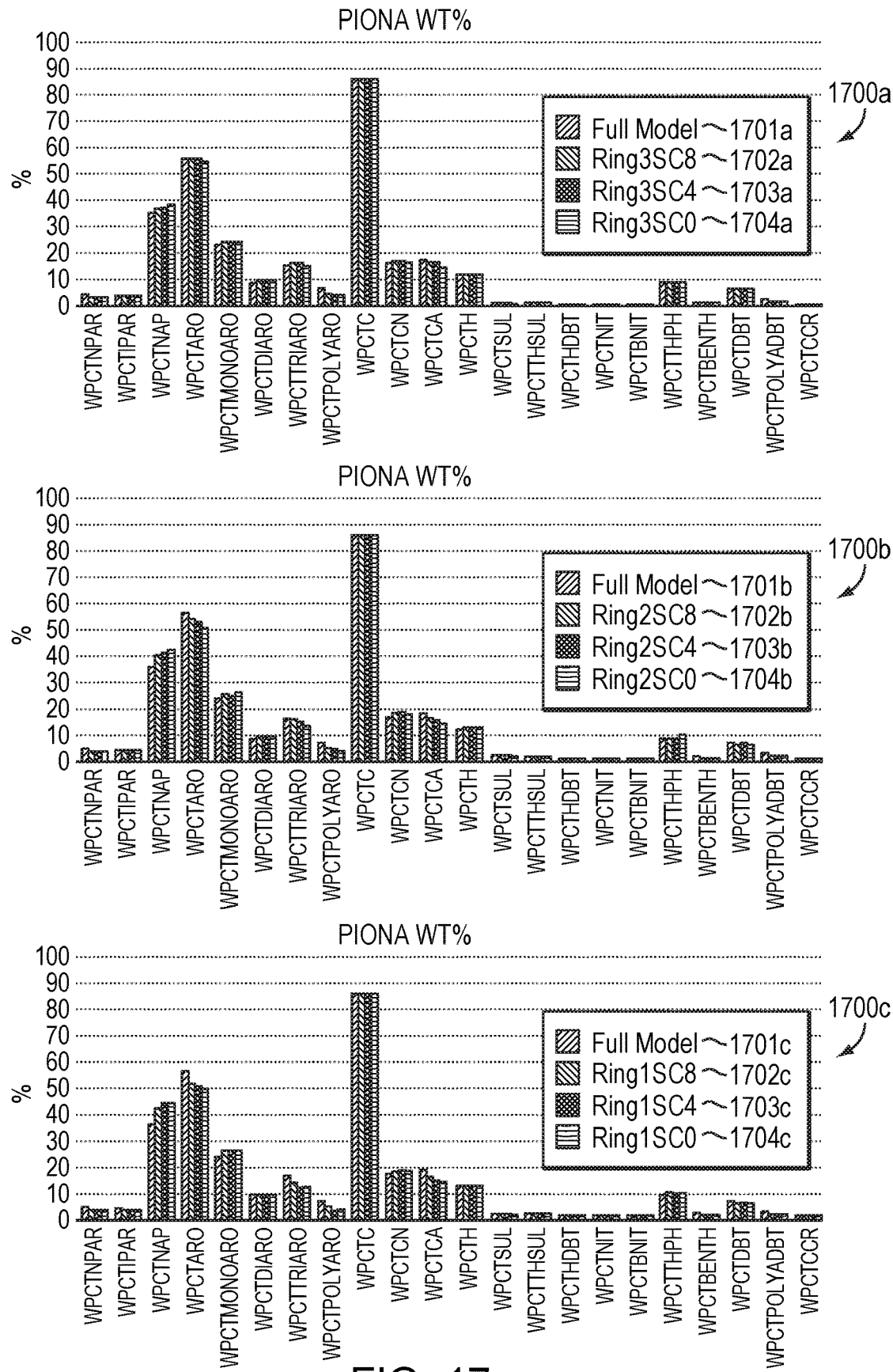

FIG. 17 shows the predicted PIONA weight fractions determined using full models and ARM models in a VGO MB hydrocracker model in the plots 1700a-c. The plot 1700a shows the predicted PIONA weight fractions determined using a full model 1701a, Ring3SC8 model 1702a, Ring3SC4 model 1703a, and Ring3SC0 model 1704a. The plot 1700b shows the predicted PIONA weight fractions determined using a full model 1701b, Ring2SC8 model 1702b, Ring2SC4 model 1703b, and Ring2SC0 model 1704b. The plot 1700c shows the predicted PIONA weight fractions determined using a full model 1701c, Ring1SC8 model 1702c, Ring1SC4 model 1703c, and Ring1SC0 model 1704c.

Figure 18:
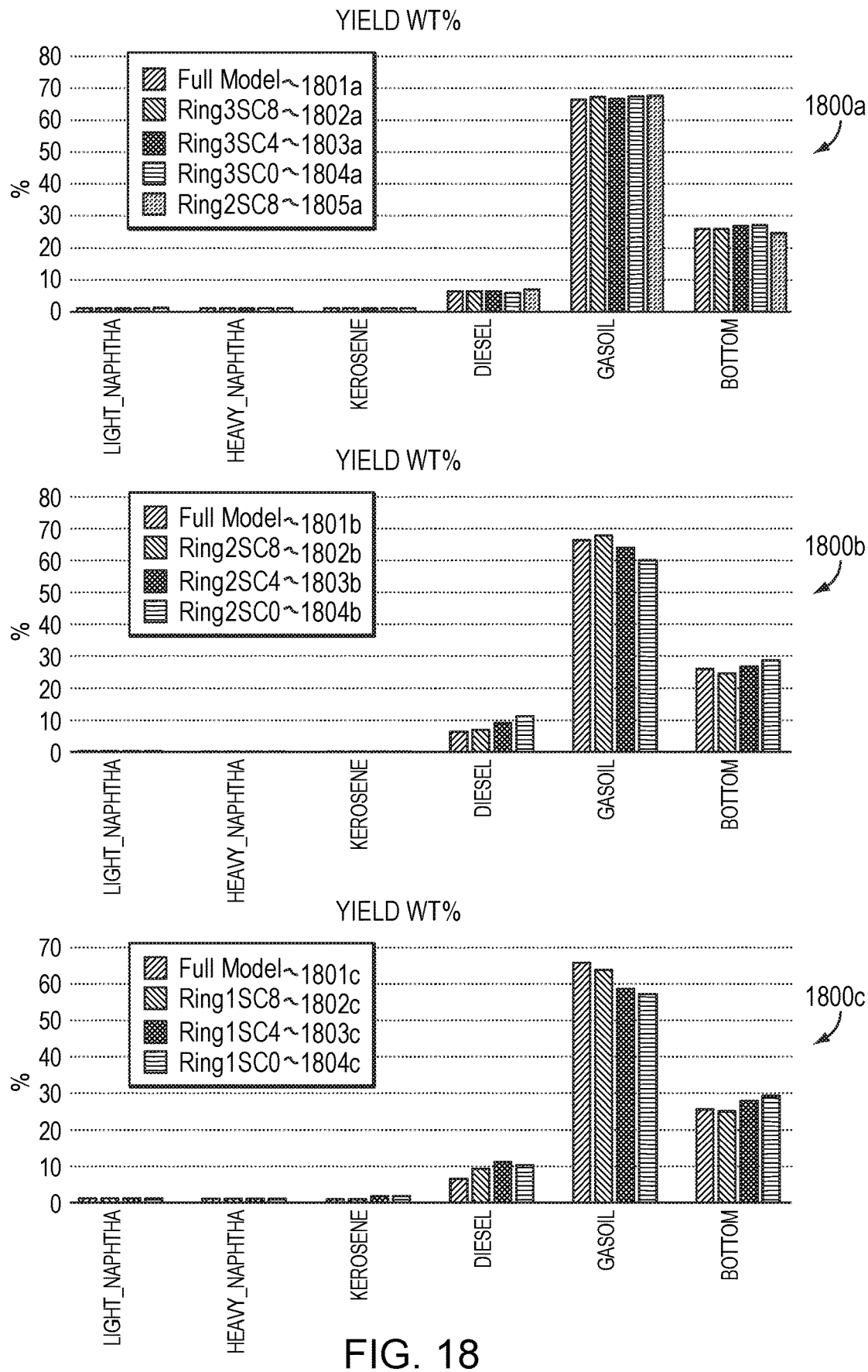

FIG. 18 shows the predicted yields determined using full models and ARM models in a VGO MB hydrocracker model in the plots 1800a-c. The plot 1800a shows the predicted yields determined using a full model 1801a, Ring3SC8 model 1802a, Ring3SC4 model 1803a, Ring3SC0 model 1804a, and Ring2SC8 model 1805a. The plot 1800b shows the predicted yields determined using a full model 1801b, Ring2SC8 model 1802b, Ring2SC4 model 1803b, and Ring2SC0 model 1804b. The plot 1800c shows the predicted yields determined using a full model 1801c, Ring1SC8 model 1802c, Ring1SC4 model 1803c, and Ring1SC0 model 1804c.

Figure 19:
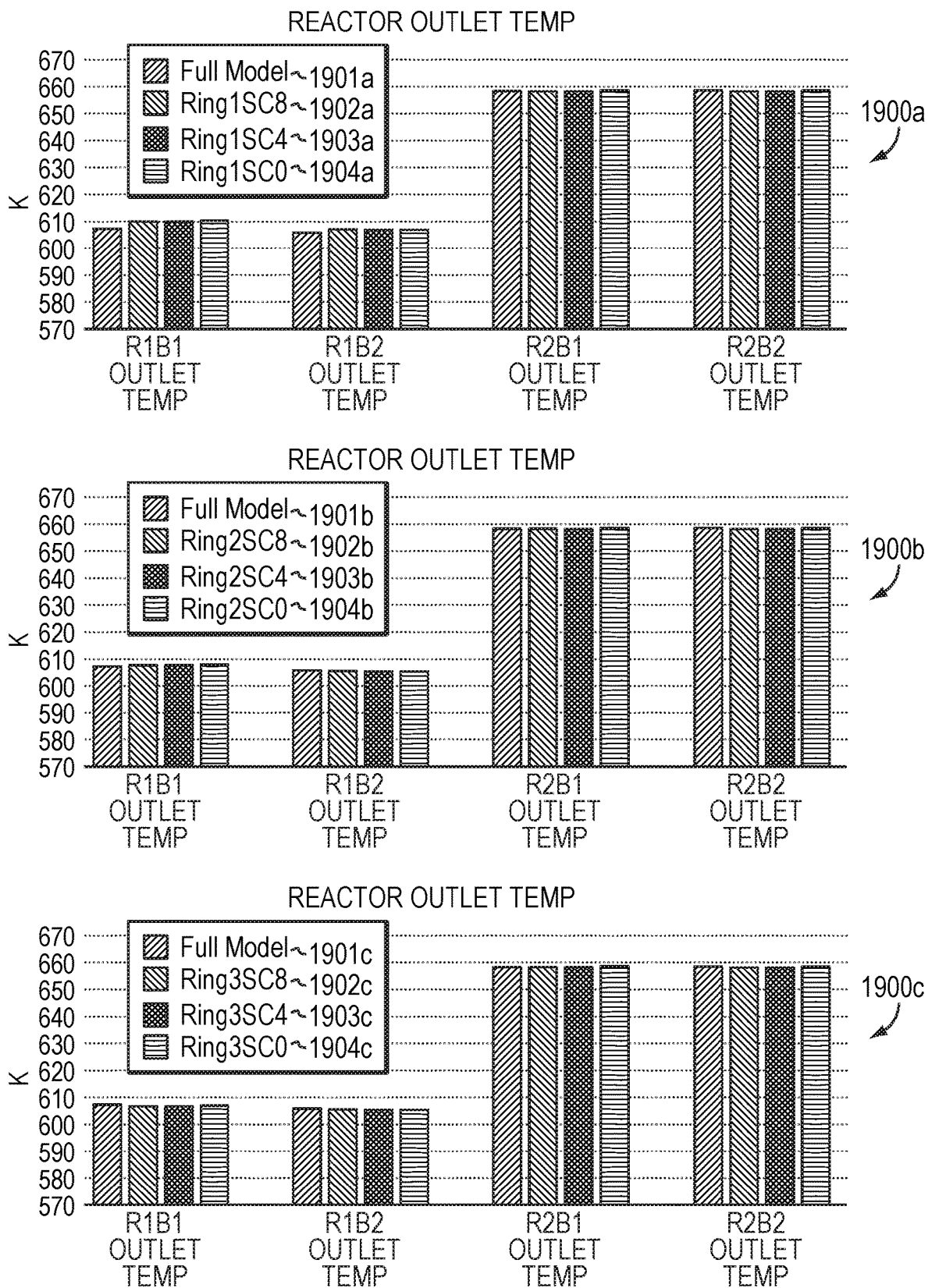

FIG. 19 shows the predicted reactor outlet temperatures determined using the full models and ARM models in a VGO MB hydrocracker model in the plots 1900a-c. The plot 1900a shows the predicted reactor outlet temperatures determined using a full model 1901a, Ring1SC8 model 1902a, Ring1SC4 model 1903a, and Ring1SC0 model 1904a. The plot 1900b shows the predicted reactor outlet temperatures determined using a full model 1901b, Ring2SC8 model 1902b, Ring2SC4 model 1903b, and Ring2SC0 model 1904b. The plot 1900c shows the predicted reactor outlet temperatures determined using a full model 1901c, Ring3SC8 model 1902c, Ring3SC4 model 1903c, and Ring3SC0 model 1904c.

FIGS. 14-19 show that there is good agreement between the results of the full model and the ARM models. The higher granularity set in the ARM model, the better match between the full model and the ARM model. The R-square results of the ARM models compared to the full model for a VGO MB hydrocracker model are shown below in Table 8.

TABLE 8

R-square results of ARM models compared to the
full model for a VGO MB hydrocracker model

| RSQ | Distillation | PIONA | C# | DBE | Wt Yield | Reactor Outlet Temp |
|---|---|---|---|---|---|---|
| Ring3SC8 | 0.99 | 1.00 | 0.98 | 0.99 | 1.00 | 1.00 |
| Ring3SC4 | 0.96 | 1.00 | 0.96 | 0.99 | 1.00 | 1.00 |
| Ring3SC0 | 0.96 | 1.00 | 0.96 | 0.99 | 1.00 | 1.00 |
| Ring2SC8 | 0.99 | 1.00 | 0.98 | 0.98 | 1.00 | 1.00 |
| Ring2SC4 | 0.95 | 0.99 | 0.96 | 0.98 | 1.00 | 1.00 |
| Ring2SC0 | 0.97 | 0.99 | 0.93 | 0.97 | 0.99 | 1.00 |
| Ring1SC8 | 0.99 | 0.99 | 0.96 | 0.92 | 1.00 | 1.00 |
| Ring1SC4 | 0.96 | 0.98 | 0.92 | 0.92 | 0.99 | 1.00 |
| Ring1SC0 | 0.97 | 0.98 | 0.95 | 0.92 | 0.98 | 1.00 |

In this MB hydrocracker model case, the consistency among the results for all scenarios of the ARM models and the results of the full model are good. The scenario of lowest granularity, Ring1SC0, gives the best computational performance, almost 18 times faster than the full model. Although the predicted results from that model are not a perfect match to that of the full model, the accuracy of the scenario of Ring1SC0 is sufficient for typical industrial applications. Therefore, the hybrid ARM approach in MB EORXR provides a highly efficient way to solve molecule-based kinetic models of complex feedstocks and conversions in a complex flowsheet. A complex reactor model of heavy oil can be solved within O (secs) without losing the detailed molecular information. The computational performance is one of the most significant challenges in applying molecular modeling to the multiscale models of a wide range of refining processes at a multi-scope level (called smart manufacturing in refining industries). The hybrid ARM model can effectively address this issue by using a finite number of attributes to describe an almost infinite number of molecular species and their reactions in a complex hydrocarbon mixture (e.g., heavy resid) and thus is the foundation for optimizing smart manufacturing in the refining industry.

Figure 20:
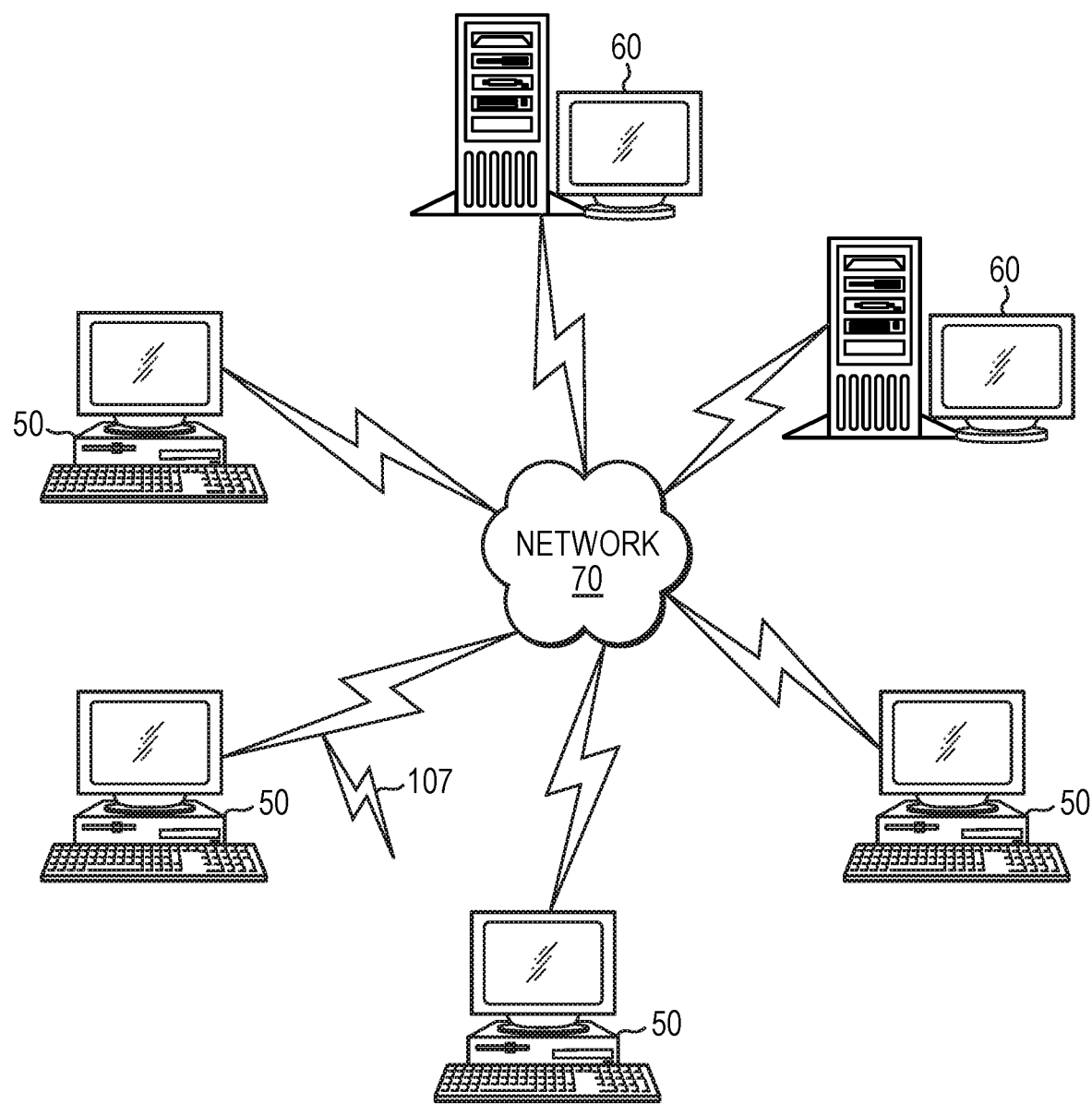
FIG. 20 depicts a computer network or similar digital processing environment in which embodiments of the present invention may be implemented.

FIG. 20 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 21:
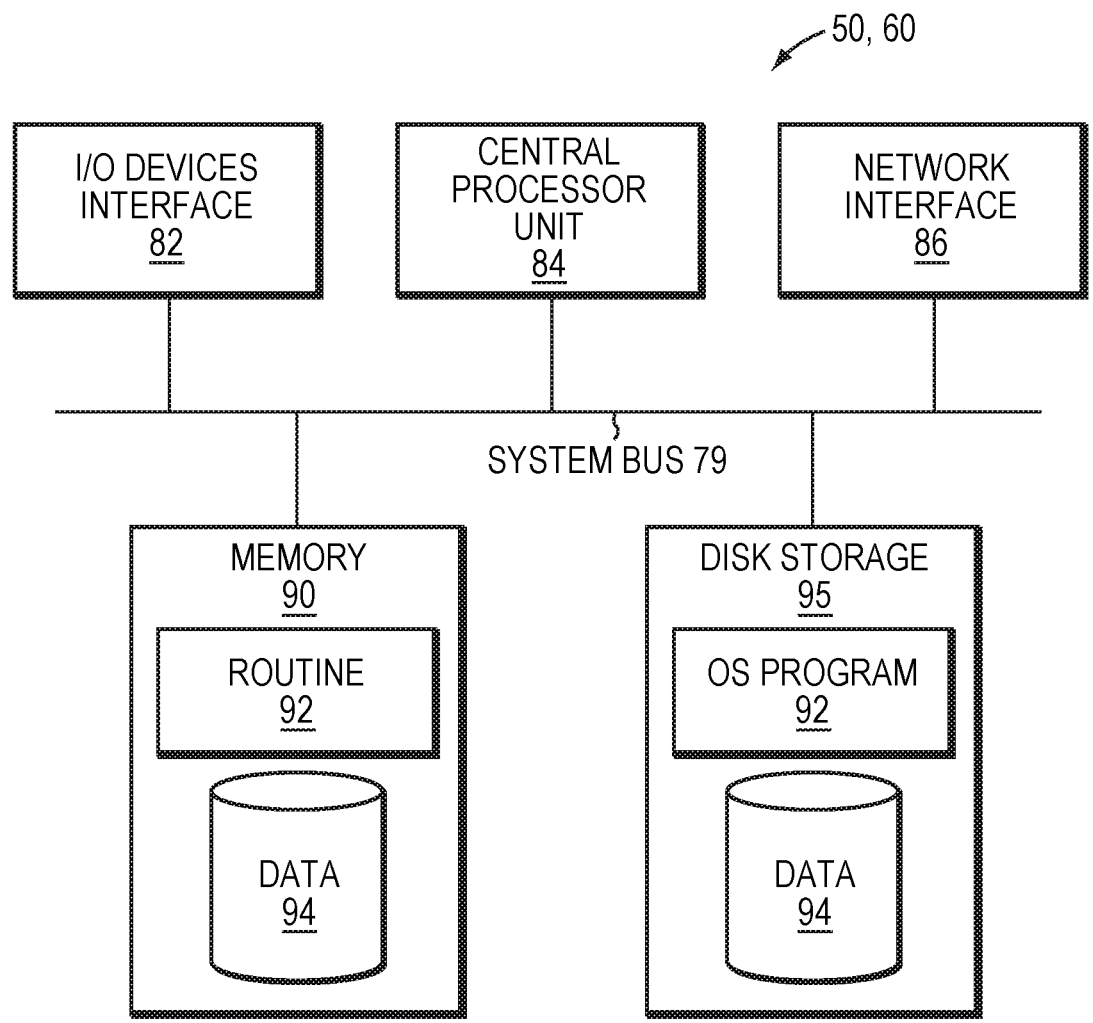
FIG. 21 is a diagram of an example internal structure of a computer in the environment of FIG. 20.

FIG. 21 is a diagram of the internal structure of a computer (e.g., client processor/device 50 or server computers 60) in the computer system of FIG. 20. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 20). Memory 90 provides volatile storage for computer software instructions 92 and data 94 (such as method 220, MB EORXR, etc. detailed above) used to implement an embodiment of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A method for real-time optimization and performance control of a chemical reaction of a feedstock in a chemical reactor, the method comprising:

using a composition model, characterizing a chemical composition of the feedstock in the chemical reactor;

converting a result of the characterizing into a molecular composition of the feedstock in the chemical reactor;

receiving a representation input;

based on the received representation input, automatically selecting a set of molecules in the molecular composition of the feedstock in the chemical reactor to represent using individual molecule structure representations;

generating and storing a representation of the molecular composition of the feedstock in the chemical reactor, the representation including both: (i) the individual molecule structure representations of the selected set of molecules in the molecular composition of the feedstock in the chemical reactor and (ii) molecular attribute representations in the molecular composition of the feedstock in the chemical reactor, and wherein the molecular attribute representations include one or more molecular type and one or more side chain, each molecular type being defined by a combination of cores and methyl groups;

accessing the individual molecule structure representations and the molecular attribute representations and, responsively, formulating and storing a representation of chemistry of the chemical reaction of the feedstock in the chemical reactor based on both: (i) the individual molecule structure representations of the selected set of molecules in the molecular composition of the feedstock in the chemical reactor and (ii) the molecular attribute representations in the molecular composition of the feedstock in the chemical reactor, wherein the representation of the chemistry of the chemical reaction includes one or more equations in terms of the one or more molecular type and the one or more side chain;

responsively, performing a simulation of the chemical reaction of the feedstock in the chemical reactor using the individual molecule structure representations of the selected set of molecules in the molecular composition of the feedstock in the chemical reactor, the molecular attribute representations in the molecular composition of the feedstock in the chemical reactor, and the formulated representation of the chemistry of the chemical reaction, the simulation determining composition of products of the chemical reaction wherein a first subset of the products of the chemical reaction are represented and stored as individual molecule structure represented products and a second subset of the products of the chemical reaction are represented and stored as attribute represented products;

sampling the attribute represented products of the second subset and automatically determining and storing individual molecule structure representations of the attribute represented products of the second subset such that the individual molecule structure representations of the first and second subsets of the products of the chemical reaction of the feedstock in the chemical reactor result;

based upon the determined individual molecule structure representations of the first and second subsets of the products of the chemical reaction, evaluating modifications to a process of the chemical reaction through simulating the formulated representation of the chemistry of the chemical reaction using an Equation Oriented (EO) method; and based on results of the evaluating, optimizing the chemical reactor in real-time by causing the chemical reactor to make one of the evaluated modifications to the process of the chemical reaction in real-time, thereby causing the chemical reactor to produce one or more of the products in the first and second subsets of the products of the chemical reaction, wherein the method is implemented by one or more computing devices.

2. The method of claim 1, wherein the representation of the chemistry of the chemical reaction includes chemical reactions derived from at least one of: thermal chemistry, acid catalyzed chemistry, or metal catalyzed chemistry.

3. The method of claim 1, further comprising:

combining the individual molecule structure represented products and the individual molecule structure representations of the attribute represented products to determine full molecular compositions of the products of the chemical reaction.

4. The method of claim 1, further comprising:

defining equations used in performing the simulation based upon user input.

5. The method of claim 4, wherein the user input is at least one of: a reaction type, a reaction path, a thermodynamic property, a physical property, or a rate law expression.

6. The method of claim 1, wherein the feedstock in the chemical reactor is at least one of: a hydro-carbon mixture, coal, or shale oil.

7. The method of claim 1, wherein the selected set of molecules is a first set of molecules, and further comprising:

selecting based upon the received representation input, a second set of molecules in the molecular composition of the feedstock in the chemical reactor to represent using the molecular attribute representations.

8. The method of claim 1, wherein the received representation input indicates a carbon number limit and a ring number limit for the set of molecules to be represented using the individual molecule structure representations.

9. The method of claim 1, further comprising at least one of:
predicting product properties based upon the determined individual molecule structure representations of the first and second subsets of the products of the chemical reaction;
modeling integration of the chemical reactor with downstream units by predicting molecular detail for the downstream units based upon the determined individual molecule structure representations of the first and second subsets of the products of the chemical reaction; or
optimizing a system of complex hydrocarbon mixtures' conversion based upon the determined individual molecule structure representations of the first and second subsets of the products of the chemical reaction using the Equation Oriented (EO) method.

10. The method of claim 1 wherein performing the simulation utilizes at least one of: attribute-based mass balance equations; attribute-based energy balance equations; or attribute-based momentum balance equations.

11. A computer-based system for real-time optimization and performance control of a chemical reaction of a feedstock in a chemical reactor, the system comprising:
one or more processors; and
one or more memories with computer code instructions stored thereon, the one or more processors and the one or more memories, with the computer code instructions, being configured to cause the system to:
using a composition model, perform a characterization of a chemical composition of the feedstock in the chemical reactor;
convert a result of the characterization into a molecular composition of the feedstock in the chemical reactor;
receive a representation input;
based on the received representation input, automatically select a set of molecules in the molecular composition of the feedstock in the chemical reactor to represent using individual molecule structure representations;
automatically generate and store a representation of the molecular composition of the feedstock in the chemical reactor, the representation including both: (i) the individual molecule structure representations of the selected set of molecules in the molecular composition of the feedstock in the chemical reactor and (ii) molecular attribute representations in the molecular composition of the feedstock in the chemical reactor, and wherein the molecular attribute representations include one or more molecular type and one or more side chain, each molecular type being defined by a combination of cores and methyl groups;
automatically access the individual molecule structure representations and the molecular attribute representations and, responsively, formulate and store a representation of chemistry of the chemical reaction of the feedstock in the chemical reactor based on both: (i) the individual molecule structure representations of the selected set of molecules in the molecular composition of the feedstock in the chemical reactor and (ii) the molecular attribute representations in the molecular composition of the feedstock in the chemical reactor, wherein the representation of the chemistry of the chemical reaction includes one or more equations in terms of the one or more molecular type and the one or more side chain;
responsively perform a simulation of the chemical reaction of the feedstock in the chemical reactor using the individual molecule structure representations of the selected set of molecules in the molecular composition of the feedstock in the chemical reactor, the molecular attribute representations in the molecular composition of the feedstock in the chemical reactor, and the formulated representation of the chemistry of the chemical reaction, the simulation determining composition of products of the chemical reaction wherein a first subset of the products of the chemical reaction are represented and stored as individual molecule structure represented products and a second subset of the products of the chemical reaction are represented and stored as attribute represented products;
sample the attribute represented products of the second subset and automatically determine and store individual molecule structure representations of the attribute represented products of the second subset such that the individual molecule structure representations of the first and second subsets of the products of the chemical reaction of the feedstock in the chemical reactor result;
based upon the determined individual molecule structure representations of the first and second subsets of the products of the chemical reaction evaluate modifications to a process of the chemical reaction through simulating the formulated representation of the chemistry of the chemical reaction using an Equation Oriented (EO) method; and
based on results of the evaluation, optimize the chemical reactor in real-time by causing the chemical reactor to make one of the evaluated modifications to the process of the chemical reaction in real-time, thereby causing the chemical reactor to produce one or more of the products in the first and second subsets of the products of the chemical reaction.

12. The system of claim 11, wherein the representation of the chemistry of the chemical reaction includes chemical reactions derived from at least one of: thermal chemistry, acid catalyzed chemistry, or metal catalyzed chemistry.

13. The system of claim 11, wherein the one or more processors and the one or more memories, with the computer code instructions, are further configured to cause the system to:
combine the individual molecule structure represented products and the individual molecule structure representations of the attribute represented products to determine full molecular compositions of the products of the chemical reaction.

14. The system of claim 11, wherein the one or more processors and the one or more memories, with the computer code instructions, are further configured to cause the system to:
define equations used in performing the simulation based upon user input.

15. The system of claim 11, wherein the selected set of molecules is a first set of molecules and, wherein the one or more processors and the one or more memories, with the computer code instructions, are further configured to cause the system to:
select based upon the received representation input, a second set of molecules in the molecular composition of the feedstock in the chemical reactor to represent using the molecular attribute representations.

16. The system of claim 11, wherein the one or more processors and the one or more memories, with the computer code instructions, are further configured to cause the system to perform at least one of:
- predicting product properties based upon the determined individual molecule structure representations of the first and second subsets of the products of the chemical reaction;
- modeling integration of the chemical reactor with downstream units by predicting molecular detail for the downstream units based upon the determined individual molecule structure representations of the first and second subsets of the products of the chemical reaction; or
- optimizing a system of complex hydrocarbon mixtures' conversion based upon the determined individual molecule structure representations of the first and second subsets of the products of the chemical reaction using the Equation Oriented (EO) method.

17. The system of claim 11 where, in performing the simulation, the one or more processors and the one or more memories, with the computer code instructions, are further configured to cause the system to utilize at least one of: attribute-based mass balance equations; attribute-based energy balance equations; or attribute-based momentum balance equations.

18. A non-transitory computer program product for real-time optimization and performance control of a chemical reaction of a feedstock in a chemical reactor, the computer program product comprising a computer-readable medium with computer code instructions stored thereon, the computer code instructions being configured, when executed by a computing device, to cause performance of:
- using a composition model, perform a characterization of a chemical composition of the feedstock in the chemical reactor;
- convert a result of the characterization into a molecular composition of the feedstock in the chemical reactor;
- receive a representation input;
- based on the received representation input, automatically select a set of molecules in the molecular composition of the feedstock in the chemical reactor to represent using individual molecule structure representations;
- automatically generate and store a representation of the molecular composition of the feedstock in the chemical reactor, the representation including both: (i) the individual molecule structure representations of the selected set of molecules in the molecular composition of the feedstock in the chemical reactor and (ii) molecular attribute representations in the molecular composition of the feedstock in the chemical reactor, and wherein the molecular attribute representations include one or more molecular type and one or more side chain, each molecular type being defined by a combination of cores and methyl groups;
- automatically access the individual molecule structure representations and the molecular attribute representations and, responsively, formulate and store a representation of chemistry of the chemical reaction of the feedstock in the chemical reactor based on both: (i) the individual molecule structure representations of the selected set of molecules in the molecular composition of the feedstock in the chemical reactor and (ii) the molecular attribute representations in the molecular composition of the feedstock in the chemical reactor, wherein the representation of the chemistry of the chemical reaction includes one or more equations in terms of the one or more molecular type and the one or more side chain;
- responsively perform a simulation of the chemical reaction of the feedstock in the chemical reactor using the individual molecule structure representations of the selected set of molecules in the molecular composition of the feedstock in the chemical reactor, the molecular attribute representations in the molecular composition of the feedstock in the chemical reactor, and the formulated representation of the chemistry of the chemical reaction, the simulation determining composition of products of the chemical reaction wherein a first subset of the products of the chemical reaction are represented and stored as individual molecule structure represented products and a second subset of the products of the chemical reaction are represented and stored as attribute represented products;
- sample the attribute represented products of the second subset and automatically determine and store individual molecule structure representations of the attribute represented products of the second subset such that the individual molecule structure representations of the first and second subsets of the products of the chemical reaction of the feedstock in the chemical reactor result;
- based upon the determined individual molecule structure representations of the first and second subsets of the products of the chemical reaction, evaluate modifications to a process of the chemical reaction through simulating the formulated representation of the chemistry of the chemical reaction using an Equation Oriented (EO) method; and
- based on results of the evaluation, optimize the chemical reactor in real-time by causing the chemical reactor to make one of the evaluated modifications to the process of the chemical reaction in real-time, thereby causing the chemical reactor to produce one or more of the products in the first and second subsets of the products of the chemical reaction.

19. The method of claim 1, further comprising, based on the evaluating, modifying one or more specifications of a reactor bed or recycle stream of the chemical reactor.

20. The method of claim 19, wherein the one or more specifications include at least one of: an inlet temperature, a pressure, or a stream density.

* * * * *